US007783574B2

(12) United States Patent
Kilby

(10) Patent No.: US 7,783,574 B2
(45) Date of Patent: Aug. 24, 2010

(54) SHARED INFORMATION NOTATION AND TRACKING

(75) Inventor: Clifton Kilby, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 999 days.

(21) Appl. No.: 11/212,159

(22) Filed: Aug. 26, 2005

(65) Prior Publication Data

US 2007/0050295 A1    Mar. 1, 2007

(51) Int. Cl.
    *G06F 21/00*    (2006.01)
(52) U.S. Cl. .......................................... 705/51; 705/50
(58) Field of Classification Search .................... 705/51
    See application file for complete search history.

(56) References Cited

U.S. PATENT DOCUMENTS

| 5,956,482 | A * | 9/1999 | Agraharam et al. ......... 709/203 |
| 6,591,295 | B1 * | 7/2003 | Diamond et al. ............ 709/217 |
| 6,823,384 | B1 * | 11/2004 | Wilson et al. ............... 709/225 |
| 6,850,614 | B1 * | 2/2005 | Collins .................. 379/265.09 |
| 6,871,213 | B1 * | 3/2005 | Graham et al. .............. 709/205 |
| 2002/0026478 | A1 * | 2/2002 | Rodgers et al. ............. 709/205 |
| 2004/0083292 | A1 * | 4/2004 | Lueckhoff et al. .......... 709/227 |
| 2004/0151318 | A1 * | 8/2004 | Duncanson, Jr. ............ 380/277 |
| 2004/0193925 | A1 * | 9/2004 | Safriel ........................ 713/202 |
| 2004/0236608 | A1 * | 11/2004 | Ruggio et al. .................. 705/2 |

\* cited by examiner

*Primary Examiner*—Calvin L Hewitt, II
*Assistant Examiner*—Zeshan Qayyum
(74) *Attorney, Agent, or Firm*—Thomas, Kayden, Horstemeyer & Risley, LLP

(57) ABSTRACT

Embodiments of the present disclosure provide methods for sharing information during a customer service session. In this regard, one embodiment of such a method comprises the steps of: displaying a plurality of consumer service input process fields associated with a plurality of consumer service process steps, where the plurality of input process fields are displayed concurrently in an interface. Further, each of the plurality of input process fields is associated with at least one record keeping system. The method further includes the steps of sharing information provided in one of the input process fields with a designated computer tool in response to receiving a command from a user and forwarding information provided in the input process fields at the end of a consumer service process to a record keeping system. Other methods and devices are also provided.

20 Claims, 32 Drawing Sheets

| Date | Specialist | BTN | ADSLTN | UserID | CCTool Service | Customer Name | Dollar Amount | Nbr of Month |
|---|---|---|---|---|---|---|---|---|
| 7/20/2005 | Jacobo Gamez | 5556401586 | 5555401586 | maria.pxxxxx | 5555554322 | MARIA Pxxxxx | 42.95 | |
| 7/20/2005 | TaShonda Tucker | 5557819774 | 5557819774 | poundxxxxx | 5552902415 | Frank Pxxxxx | 15 | |
| 7/19/2005 | Jennifer Davis | 5556372740 | 5556372740 | famxxxx | 5552676481 | Robert Douglas | 89.95 | |
| 7/19/2005 | Telesia Streeter | 5557488255 | 5557488255 | lisaxxxxx | 5559447629 | LISA CExxxxx | 7.24 | |
| 7/19/2005 | Estelita Simmons | 5557598335 | 5557598335 | wkxxxxx | 5551863228 | durden, xxxxx | 69.90 | |
| 7/19/2005 | Jennifer Davis | 5557733508 | 5557733508 | helluxxxxxxx | 5559302030 | Mike Loxxxxx | 59.95 | |
| 7/19/2005 | Bryan Schaus | 5552749989 | 5552749989 | arthxxxxx | 5557859806 | Arthur Joxxxxx | 90.00 | |
| 7/19/2005 | Austin Cooper | 5552336544 | 5552336544 | missixxxxxxx | 5557473207 | Missie Sixxxxx | 39.95 | |
| 7/18/2005 | Troy M. Seon | 5557120821 | 5557120821 | clevenxxxxxxx | 5558478881 | Raymonxxxxx | 5 | |
| 7/18/2005 | Jacobo Gamez | 5555378520 | 5556378520 | lopexxxxx | 5558197428 | MARIA Lxxxxx | 42.95 | |
| 7/18/2005 | TaShonda Tucker | 5558575298 | 5558575298 | perlxxxxx | 5555921519 | RUEL JRxxxxx | 37.11 | |
| 7/18/2005 | Bryan Schaus | 5556241331 | 5556241332 | incxxxxx | 5552265583 | Max Hexxxxx | 149.95 | |
| 7/18/2005 | Troy M. Seon | 5552624274 | 5556352950 | tedxxxxxxxxx | 5557868060 | Ted McCxxxxx | 54.95 | |
| 7/18/2005 | TaShonda Tucker | 5557525743 | 5557525743 | moonxxxxx | 5558150906 | James E. xxxxx | 47.46 | |
| 7/18/2005 | Veronica Knox-Simpkins | Lauren | 5557733696 | helioxxxx | 5557710126 | Logan, Mxxxxx | 59.95 | |
| 7/18/2005 | Garnett Hill | 5558481898 | 5558481898 | jmcxxxxx | 5556708603 | CABANISxxxxx | 10 | |
| 7/15/2005 | Tim Gray | 5559794494 | 5559794494 | mkxxxxx | 555385091 | marci. koxxxxx | 37.95 | |
| 7/15/2005 | Austin Cooper | 5559413735 | 5559413735 | mallorxxxxxxxx | 5559228567 | MALLORxxxxx | 99.95 | |
| 7/15/2005 | Petrina Singletary | 5556457900 | 5556457900 | luigxxxxx | 5556690003 | Fabbrxxxxx | 30.00 | |
| 7/14/2005 | Jacobo Gamez | 5556352102 | 5556352102 | peralxxxxx | 5559087253 | YOSHIRCxxxxx | 54.95 | |
| 7/14/2005 | Jacobo Gamez | 5557532089 | 5557532089 | jordaxxxxx | 5558161820 | JAMES Jxxxxx | 34.95 | |
| 7/14/2005 | Garnett Hill | 5557814134 | 5557817972 | caswnxxxx | 5558362800 | Richmoncxxxxx | 10 | |
| 7/14/2005 | Jacobo Gamez | 5555693547 | 5555693547 | hemxxxxx xxxx | 5558782078 | MARIA Hxxxxx | 42.95 | |
| 7/14/2005 | Petrina Singletary | 5559324643 | 5559324643 | ebruxxxx | 5559131679 | BRUMFIExxxx | 4.95 | |
| 7/14/2005 | Jason Mozingo | 5552026993 | 5552026993 | nonxxxx | 5556574184 | DERENAxxxxx | 27.95 | |
| 7/14/2005 | Shaun Lowery | 5554457561 | 5554457561 | moxxxxx | 5552119983 | Young, Lxxxxx | 10 | |
| 7/14/2005 | Jennifer Davis | 5556252924 | 5556254240 | syxxxxx | 5558257204 | Robert Mxxxxxx | 49.95 | |
| 7/14/2005 | TaShonda Tucker | 5553641815 | 5553641815 | canxxxxx | 5553641815 | CARTER xxxxx | 5 | |
| 7/14/2005 | Shaun Lowery | 5554266649 | 5554266649 | mmxxxxx | 5554266649 | Margaret xxxxx | 32.95 | |
| 7/13/2005 | Estelita Simmons | 5553874814 | 5553874814 | parrenxxxxx | 5556110865 | PARRENxxxxx | 29.95 | |
| 7/13/2005 | Petrina Singletary | 5552998065 | 5552998065 | nursxxxxx | 5557848128 | RUSS, Dxxxxx | 32.95 | |
| 7/13/2005 | Troy M. Seon | 5558559400 | 5558559400 | hebexxxxx | 5559020968 | BRIAN Hxxxxx | 32.95 | |
| 7/13/2005 | Bryan Schaus | 5559351807 | 5559367738 | lauxxx xxxxx | 5558950131 | Laura Hxxxxx | 30 | |
| 7/13/2005 | Troy M. Seon | 5555414317 | 5555414317 | rivexxxxx | 5558207226 | Veronica xxxxx | 40.95 | |
| 7/13/2005 | TaShonda Tucker | 5559812656 | 5559812656 | ansxxxxx | 5558516692 | sereal, xxxxx | 49.05 | |
| 7/13/2005 | Tim Gray | 5556941221 | 5556941221 | sharxxxx | 555181485 | Lauren Alxxxxx | 50 | |
| 7/12/2005 | Nate Muirheid | 5556466991 | 5556466991 | radxxxxx | 5557595341 | T.J.JOCLxxxxx | 24.95 | |
| 7/12/2005 | Petrina Singletary | 5555350468 | 5555350468 | mclxxxxx | 5551972561 | mclaughlixxxxx | 30.00 | |

| rID | Number | Callstart | Callstop | Length | Credit | Efficiency | Campaign | Current Customers | Gap Time |
|---|---|---|---|---|---|---|---|---|---|
| BACK | Adrian Price | 07/20/2005-07/20/2005 | | | | | | | |
| 44465 | 5552394279 | 10:47:00 | 10:48:00 | 1.070000 | 1.72 | 161.25 | Cons-No Surf | Current Customers | 00:00:00 |
| 44472 | 5558225885 | 10:48:00 | 10:49:00 | 1.170000 | 1.72 | 147.43 | Cons-No Surf | Current Customers | 00:00:00 |
| 44478 | 5552655955 | 10:49:00 | 10:51:00 | 1.200000 | 1.72 | 143.33 | Cons-No Surf | Current Customers | 00:00:00 |
| 44487 | 5559873284 | 10:51:00 | 10:52:00 | 1.680000 | 1.72 | 102.18 | Cons-No Surf | Current Customers | 00:00:00 |
| 44501 | 5554249936 | 10:52:00 | 10:54:00 | 1.700000 | 1.27 | 74.71 | Cons-No Surf | Current Customers | 00:00:00 |
| 44507 | 5553460752 | 10:54:00 | 10:55:00 | 0.820000 | 1.72 | 210.61 | Cons-No Surf | Current Customers | 00:00:00 |
| 44512 | 5558299445 | 10:55:00 | 10:56:00 | 0.970000 | 1.6 | 165.52 | Cons-No Surf | Current Customers | 00:00:00 |
| 44516 | 5553389341 | 10:56:00 | 10:57:00 | 0.750000 | 1.72 | 229.33 | Cons-No Surf | Current Customers | 00:00:00 |
| 44523 | 5556450159 | 10:57:00 | 10:58:00 | 1.020000 | 1.72 | 169.18 | Cons-No Surf | Current Customers | 00:00:00 |
| 44526 | 5558296331 | 10:58:00 | 10:58:00 | 0.730000 | 1.72 | 173.18 | Cons-No Surf | Current Customers | 00:00:00 |
| 44531 | 5552385030 | 10:58:00 | 11:00:00 | 1.230000 | 1.72 | 139.46 | Cons-No Surf | Current Customers | 00:00:00 |
| 44545 | 5556510664 | 11:00:00 | 11:02:00 | 2.350000 | 1.27 | 54.04 | Cons-No Surf | Current Customers | 00:00:00 |
| 44554 | 5554760431 | 11:02:00 | 11:03:00 | 1.300000 | 1.72 | 132.31 | Cons-No Surf | Current Customers | 00:00:00 |
| 44564 | 5553935837 | 11:03:00 | 11:04:00 | 1.250000 | 1.72 | 137.6 | Cons-No Surf | Current Customers | 00:00:00 |
| 44569 | 5556514605 | 11:04:00 | 11:05:00 | 0.530000 | 1.27 | 238.13 | Cons-No Surf | Current Customers | 00:00:00 |
| 44580 | 5553789256 | 11:05:00 | 11:07:00 | 1.480000 | 1.27 | 85.62 | Cons-No Surf | Current Customers | 00:00:00 |
| 44585 | 5553713276 | 11:07:00 | 11:07:00 | 0.900000 | 1.72 | 191.11 | Cons-No Surf | Current Customers | 00:00:00 |
| 44595 | 5557770933 | 11:07:00 | 11:09:00 | 1.500000 | 1.27 | 84.67 | Cons-No Surf | Current Customers | 00:00:00 |
| 44599 | 5556426586 | 11:09:00 | 11:10:00 | 0.830000 | 1.6 | 192 | Cons-No Surf | Current Customers | 00:00:00 |
| 44608 | 5558689821 | 11:10:00 | 11:11:00 | 1.220000 | 1.72 | 141.37 | Cons-No Surf | Current Customers | 00:00:00 |
| 44617 | 5553532372 | 11:11:00 | 11:13:00 | 2.320000 | 1.27 | 54.82 | Cons-No Surf | Current Customers | 00:00:00 |
| 44623 | 5554493555 | 11:13:00 | 11:14:00 | 0.750000 | 1.6 | 213.33 | Cons-No Surf | Current Customers | 00:00:00 |
| 44638 | 5553342446 | 11:14:00 | 11:16:00 | 1.770000 | 1.72 | 97.36 | Cons-No Surf | Current Customers | 00:00:00 |
| 44648 | 5553481974 | 11:16:00 | 11:17:00 | 1.280000 | 1.72 | 134.03 | Cons-No Surf | Current Customers | 00:00:00 |
| 44664 | 5552306338 | 11:17:00 | 11:19:00 | 2.150000 | 1.6 | 74.42 | Cons-No Surf | Current Customers | 00:00:00 |
| 44673 | 5555137904 | 11:19:00 | 11:20:00 | 1.130000 | 1.6 | 141.18 | Cons-No Surf | Current Customers | 00:00:00 |
| 44678 | 5555953077 | 11:20:00 | 11:21:00 | 0.900000 | 1.72 | 191.11 | Cons-No Surf | Current Customers | 00:00:00 |

FIGURE 33

# SHARED INFORMATION NOTATION AND TRACKING

TECHNICAL FIELD

The present disclosure is generally related to computer processes and, more particularly, is related to sharing of information during computer processes.

BACKGROUND

To enable organizations to better serve their customers, different processes and procedures are used to interact with the customers. Often, various levels of service agents and specialists within different service areas and departments of an organization throughout a day fill in similar, if not the exact same, information into multiple computer applications or tools. The information is utilized to service a customer and gather pertinent information that may be used to provide customer services. Such duplication of data between computer tools used to access customers' accounts and provide services is an inefficient use of an organization's resources and an agent's time.

To illustrate, a customer service agent may have, at one time, open on his or her computer desktop a customer's record; a spreadsheet for situational records; a text document used for notations; and a desk or group specific database or two to record group specific data. Keeping desktop windows open for each record, spreadsheet, etc. are resource consuming. Further, switching back and forth between each is tedious and time consuming.

Thus, a heretofore unaddressed need exists in the industry to address the aforementioned deficiencies and inadequacies.

SUMMARY

Embodiments of the present disclosure provide methods for sharing information during a customer service session. In this regard, one embodiment of such a method comprises the steps of: displaying a plurality of consumer service input process fields associated with a plurality of consumer service process steps, where the plurality of input process fields are displayed concurrently in an interface. Further, each of the plurality of input process fields are associated with at least one record keeping system. The method further includes the steps of sharing information provided in one of the input process fields with a designated computer tool in response to receiving a command from a user and forwarding information provided in the input process fields at the end of a consumer service process to a record keeping system.

Other systems, devices, methods, features, and advantages of the present disclosure will be or become apparent to one with skill in the art upon examination of the following drawings and detailed description. It is intended that all such additional systems, devices, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10 is a screenshot display of one embodiment of a notation template tool interface of FIG. 2.

FIGS. 12-25 are screenshot displays of interfaces of computer tools and report displays that are activated from commands generated by the notation template tool interface of FIG. 11.

FIG. 33 is a screenshot display of one embodiment of a display of a report activated from a command generated by the notation template tool interface of FIG. 11.

DETAILED DESCRIPTION

Figure 1:
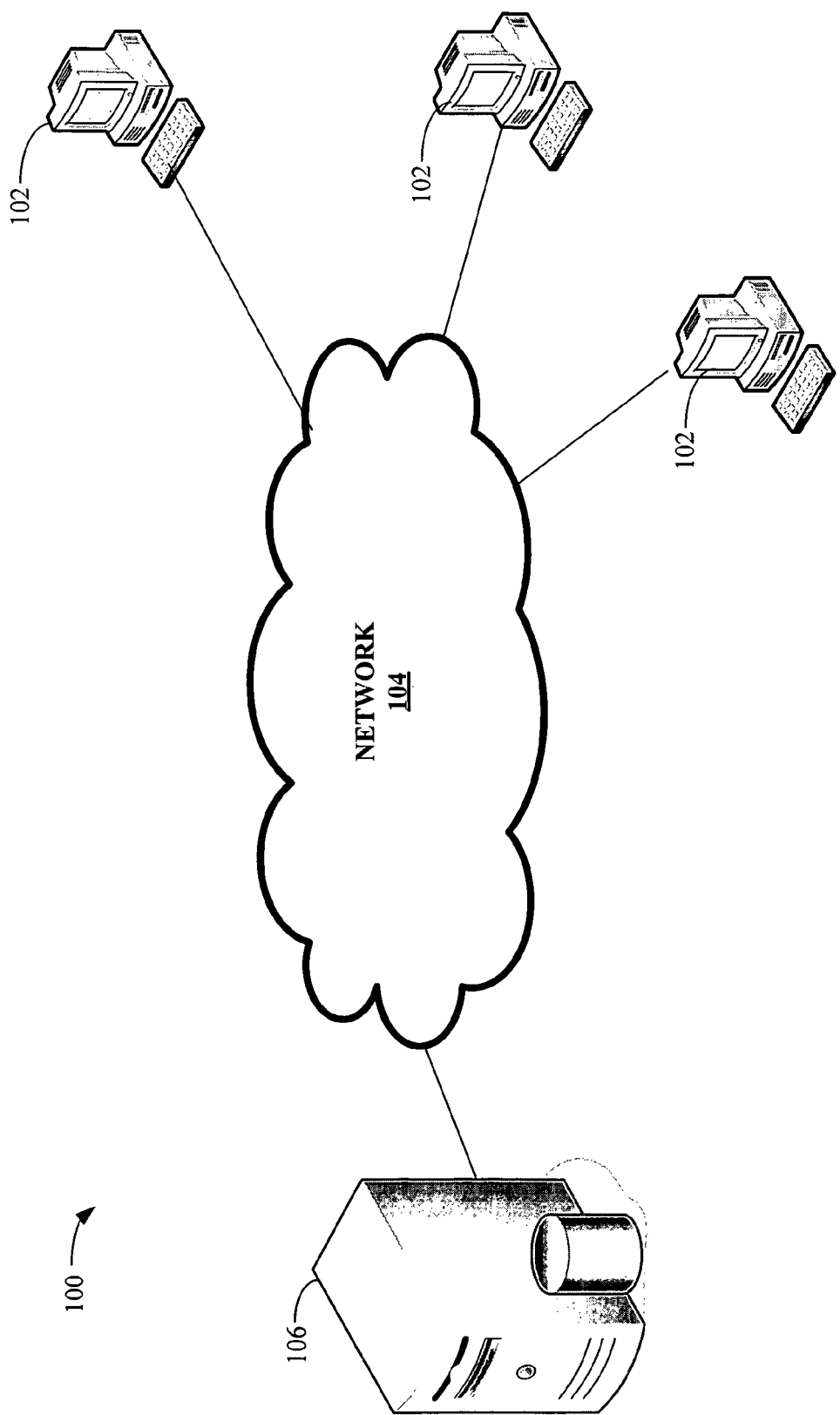
FIG. 1 is a block diagram of an example operating environment in which a customer information notation and tracking system of the present disclosure can be used.

Referring now to the drawings, in which like numerals indicate corresponding parts throughout the several views, FIG. 1 illustrates an example operating environment 100 in which a customer information notation and tracking system of the present disclosure can be used. As indicated in this figure, the environment can include one or more computing devices 102 that, by way of example, can comprise personal computers (PCs). As is further indicated in FIG. 1, each of the computing devices 102 can be connected to a network 104. The network 104 may comprise one or more sub-networks that are communicatively coupled to each other. By way of example, these networks can include one or more local area networks (LANs) and/or wide area networks (WANs). In some embodiments, the network 104 comprises a set of networks that forms part of the Internet. Also shown connected to the network 104 is a network server 106 that manages access to network databases and network applications or computer tools. Although a network server 106 is described and shown, it is to be appreciated that a server 106 is identified as an example only and is not intended to limit the scope of the present disclosure.

Figure 2:
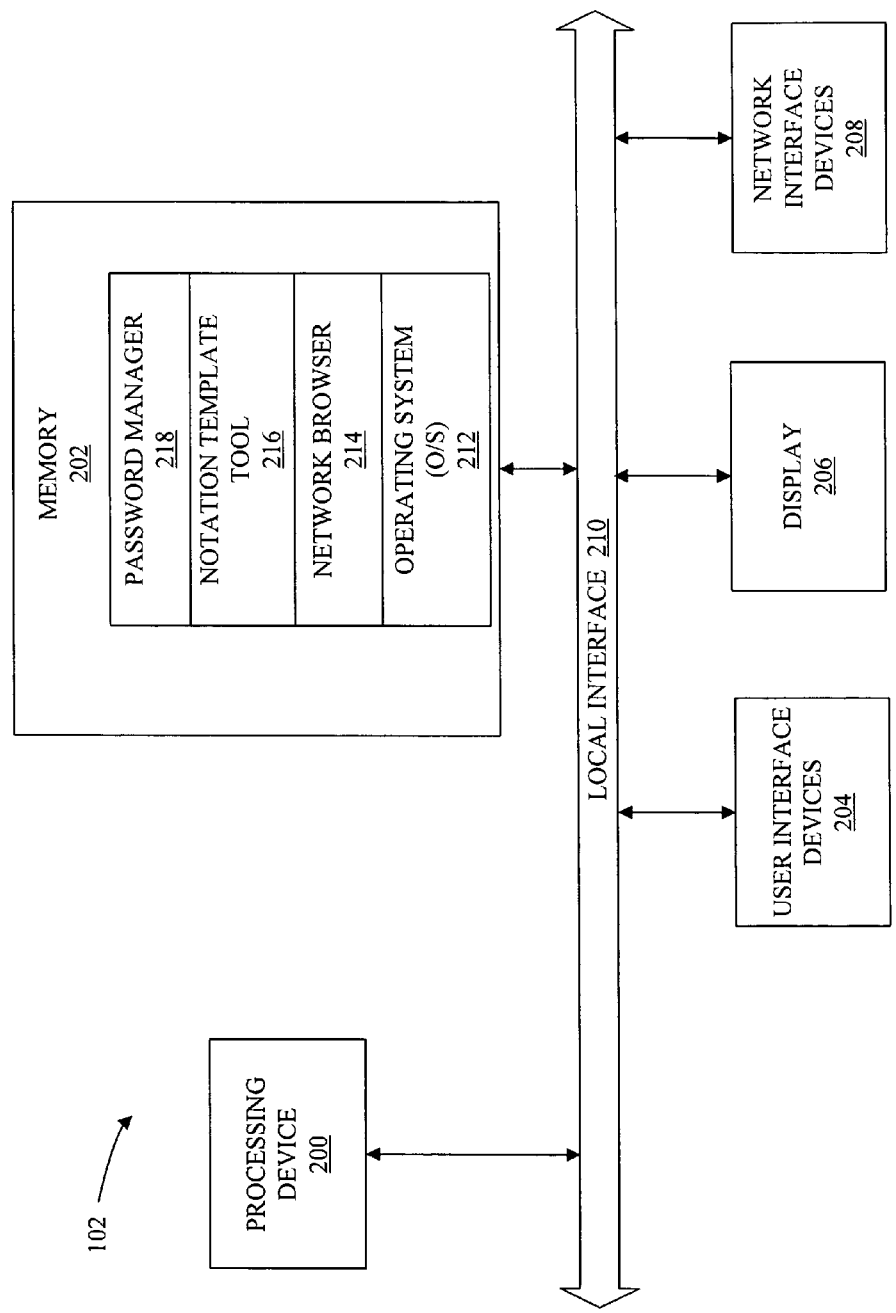
FIG. 2 is a schematic view illustrating an example architecture for a computing device of FIG. 1.

FIG. 2 is a schematic view illustrating an example architecture for the computing devices 102. As indicated in FIG. 2, each computing device 102 can comprise a processing device 200, memory 202, one or more user interface devices 204, a display 206, one or more network interface devices 208, and a local interface 210 to which each of the other components electrically connects. The local interface 210 may have additional elements, which are omitted for simplicity, such as controllers, buffers (caches), drivers, repeaters, and receivers to enable communications. Furthermore, the local interface 210 may include address, control, and/or data connections to enable appropriate communications among the aforementioned components.

The processing device 200 can include any custom made or commercially available processor, a central processing unit (CPU) or an auxiliary processor among several processors associated with the computing device 102, a semiconductor based microprocessor (in the form of a microchip), or a macroprocessor. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The user interface devices 204 may comprise those normally used in conjunction with a PC, among others. For instance, the user interface devices 204 can comprise a keyboard and mouse. Similarly, the display 206 can comprise a display device used with a PC, such as a computer monitor. The one or more network interface devices 208 comprise the hardware with which the computing device 102 transmits and receives information over the network 104. By way of example, the network interface devices 208 include components that communicate both inputs and outputs, for instance, a modulator/demodulator (e.g., modem), a radio frequency (RF) or other transceiver, a telephonic interface, a bridge, a router, etc.

The memory 202 comprises various software programs including, among others, an operating system 212, a network browser 214, a notation template tool 216; and a password manager application 218. The operating system 212 controls the execution of other software, such as the network browser 214, and provides scheduling, input-output control, file and data management, memory management, and communication control and related services. The network browser 214 is configured to enable connection and navigation of the network 104. By way of example, the network browser 214 can comprise a web browser such as Internet Explorer® from Microsoft. Although the operating system 212, the network browser 214, notation template tool 216, and password manager 218 are the only programs identified in memory 202, persons having ordinary skill in the art will appreciate that other programs may be stored within device memory, if desired.

An example operating environment 100 for a customer information notation and tracking system having been described above, operation of the customer information notation and tracking system will now be discussed. In the discussion that follows, a flow diagram is provided. It is to be understood that the functional descriptions within the presented blocks and other elements of the flow diagram represent modules, segments, or portions of code that include one or more executable instructions for implementing specific logical functions or steps. Persons having ordinary skill in the art will appreciate that alternative implementations are feasible. Moreover, the functions or steps may be executed out of order from that shown or discussed, including substantially concurrently or in reverse order, depending on the functionality involved.

Figure 3:
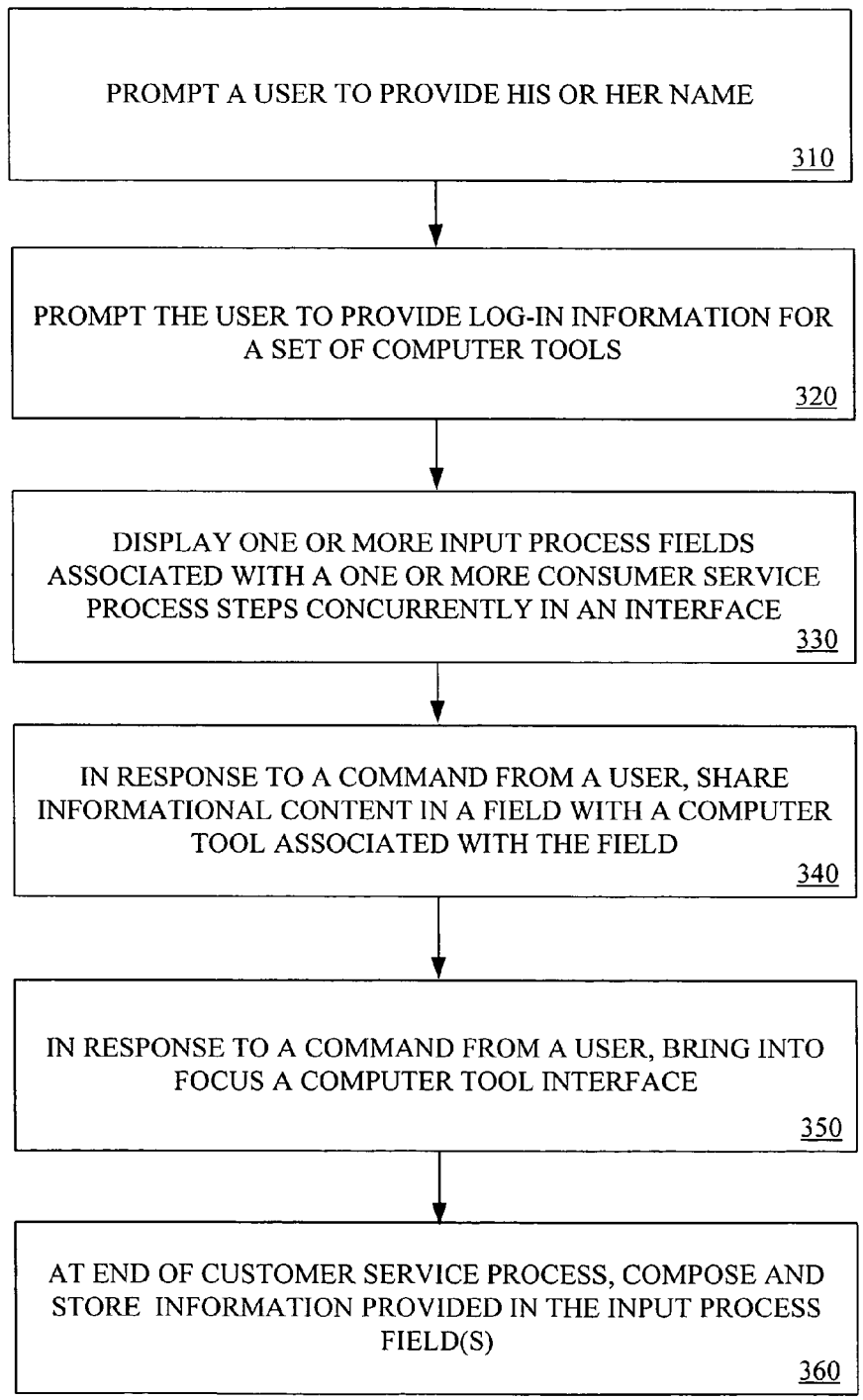
FIG. 3 is a block diagram of one embodiment, among others, of a customer information notation and tracking process of the present disclosure.

FIG. 3 is a block diagram of one embodiment, among others, of a customer information notation and tracking process of the present disclosure. Certain embodiments of the information notation and tracking system provide computer tools to reduce unnecessary duplication of data between applications used to access customers' accounts during customer service calls, or while providing other customer service actions. Further, certain embodiments of the customer notation and tracking system also establish a uniform notes generation system so that interactions can be documented quickly and reviewed effectively by supervisors or others.

Further, since a customer service agent often logs into different computer systems throughout a day with different user identifications and passwords, certain embodiments of the customer notation and tracking system provide tool(s) for easily logging into multiple computer systems or tools. For instance, with a password manager 218 of one embodiment of the customer notation and tracking system, a customer service agent may easily log into forty different computer system having forty different user-identifications and passwords, if need be.

Figures 4, 5:
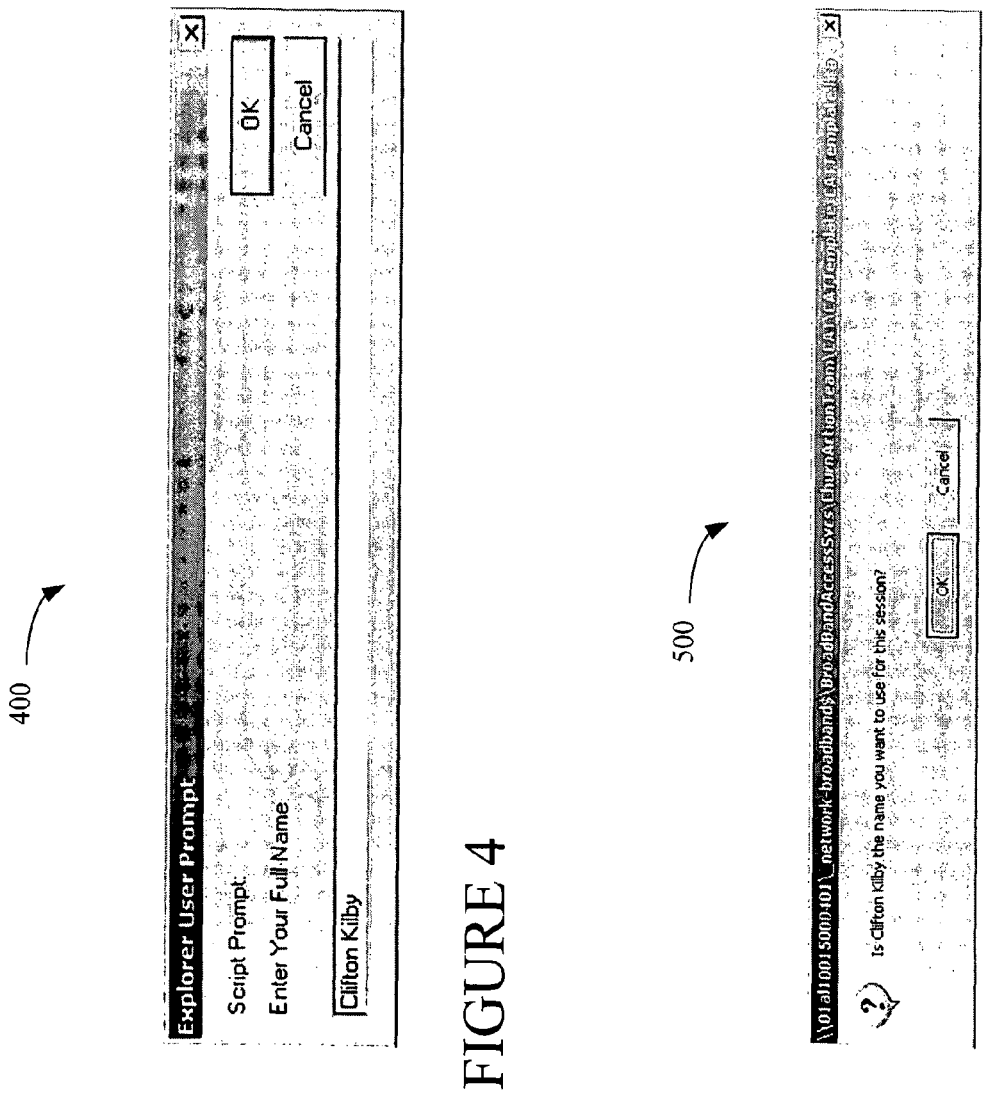
FIG. 4 is a screenshot display of a sample interface for providing user identification in accordance with the system of FIG. 1.
FIG. 5 is a screenshot display of a sample confirmation prompt for the interface of FIG. 4.

Referring now to FIG. 3, a flow chart describes one embodiment, among others, of a process 300 for sharing information during a customer service session, in accordance with the present disclosure. The process 300 starts at block 310. In block 310, a user is prompted to provide his or her name. To illustrate, a customer service agent may identify himself or herself at startup of a customer service application. Accordingly, FIG. 4 displays a screenshot 400 of a sample interface for providing user identification, and a confirmation prompt 500 is shown in FIG. 5.

Then, the user is prompted to provide (320) log-in information for a set of computer tools that are generally utilized in performing customer relationship services. Also, a password manager application 218 may be launched to facilitate input of the log-in information. In one embodiment, the password manager application 218 displays a form interface for filling out user identifications and passwords associated with multiple computer tools or applications that are often utilized by customer service agents for an organization.

Figure 6:
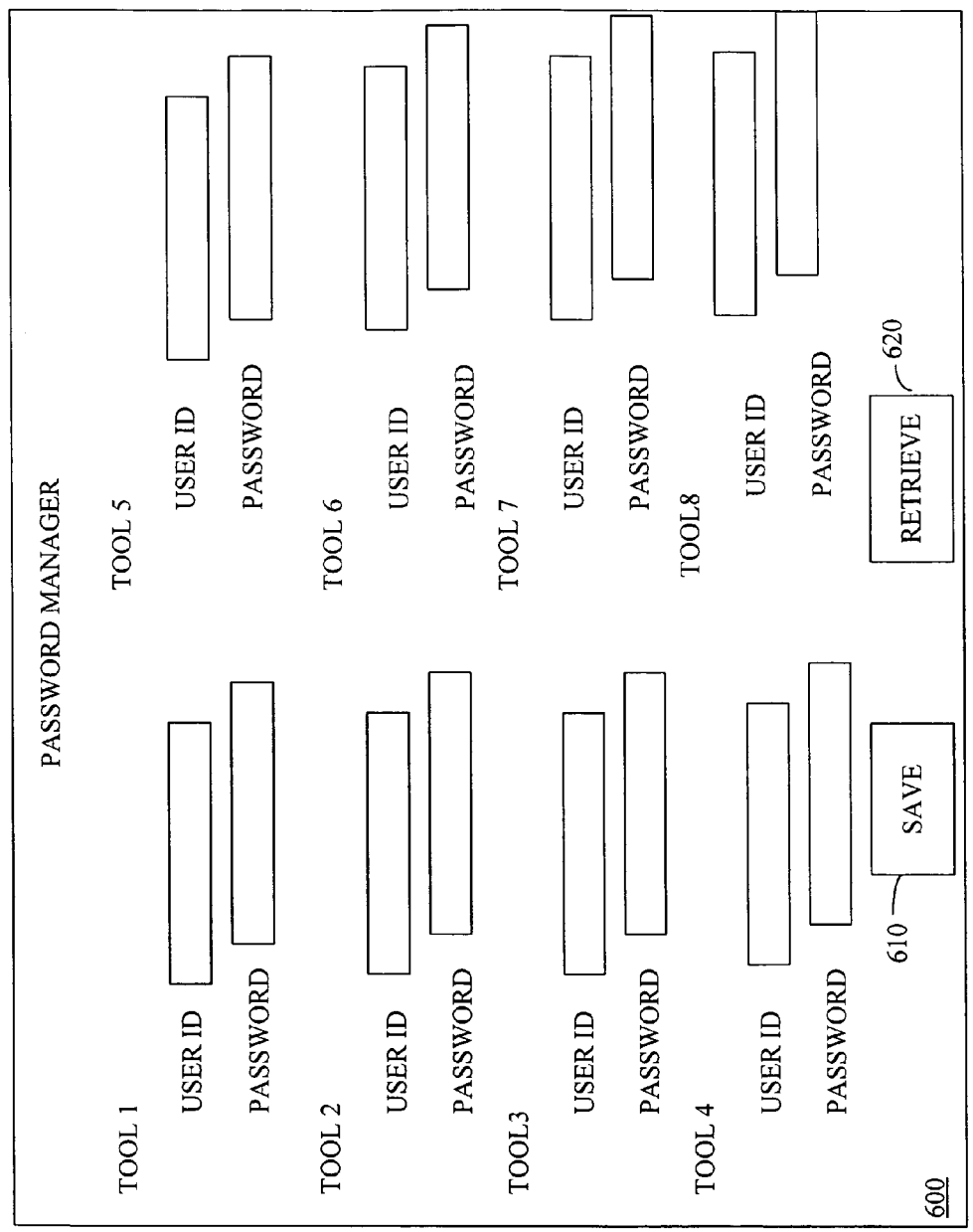
FIG. 6 is a diagram illustrating one embodiment of an interface of a password manager application of FIG. 2.

FIG. 6 displays one embodiment of an interface 600 of the password manager 218. As shown, if a user has not previously filled out his or her user identification and passwords for the computer tools often utilized by the user, then the user provides his or her user identifications (e.g., user-ids) and passwords in the form provided by the password manager interface 600.

For computer tools that are identified in the form (e.g., "Tool 1") but not often utilized by the user, a user may leave the entries for the computer tool blank or input an indicator, such as "0," to indicate that the user does not have a user identification and password for the particular tool. After the user provides the requested information for the desired tools, then the user selects the SAVE button 610 on the form provided by the password manager interface 600. In response, the password manager 218, in some embodiments, prompts the user to provide an encryption key that is to be used to decrypt the user's information in an encrypted password string.

After the encryption process is completed, the encrypted password string is displayed to the user as a text string. Accordingly, the user may "copy" the text string and "paste" the string in a document file for saving. An illustrative example of this process is provided in a later discussion.

If the user had previously provided his or her user identification and password information to the password manager interface, then the user selects the RETRIEVE button 620 on the password manager interface 600. In response to this selection, the password manager interface 600 displays an interface box prompting the user to provide the encrypted password string that was previously provided to the user. In addition, the password manager tool 218 also prompts the user for his or her encryption key. After receiving these two pieces of information, the password manager 218 decrypts the encrypted password string using the encryption key to determine the user identifications and passwords for the computer tools that are utilized by the user. The user's identification and password information is then stored in memory 202 for later use, if necessary (and in some embodiments, information may also be maintained by a server). In some embodiments, interface preferences for other computer tools, such as notation template tool 216, may also be specified and stored in the encrypted password string, so that they may be implemented each time the user initiates a session with the particular tool. If a user later updates a password, or changes a preference, the user creates a new encrypted password string. An illustrative example of this process is provided in a later discussion.

Referring back to FIG. 3, after completing the process of obtaining the user's identification and password information, one or more input process fields associated with a one or more customer service process steps (such as steps performed during a service call, among others) are displayed (330) concurrently in an interface. Each of the input process field(s) are associated with at least one record keeping system, such that information provided in the field is to be stored in one or more record keeping systems or databases. Accordingly, in response to a command from a user (e.g., "double clicking" a cursor controlled by a mouse control within a field), informational content in the field is shared (340) (e.g. by remotely inputting content, placing content into an accessible clipboard area, etc.) with a computer tool associated with the field. Further, in response to a command from a user (e.g., selecting a tool from a drop-down menu, providing information in a designated field, etc.), an interface of a computer tool is brought (350) into focus on a computer desktop. In some embodiments, the selected tool is activated and provided log-in information (e.g., which is stored in memory from a prior session where the log-in information was obtained), such that the tool interface is brought into focus with the user already being logged into the tool. Accordingly, in some embodiments, the tool may be provided other information (e.g., telephone number, customer name, etc.) provided in the field (s), so that the tool may display a record (or report, etc.) associated with information from the field(s). Further, in some embodiments, a user may designate which computer tool is activated and brought into focus in his or her preferences or preference information, as previously mentioned, that is maintained in an encrypted password string.

At the end of the customer service process, information provided in the input process field(s) is composed and stored (360) in one or more record keeping systems or databases. Illustrative examples of this process are provided in later discussions.

Figure 7:
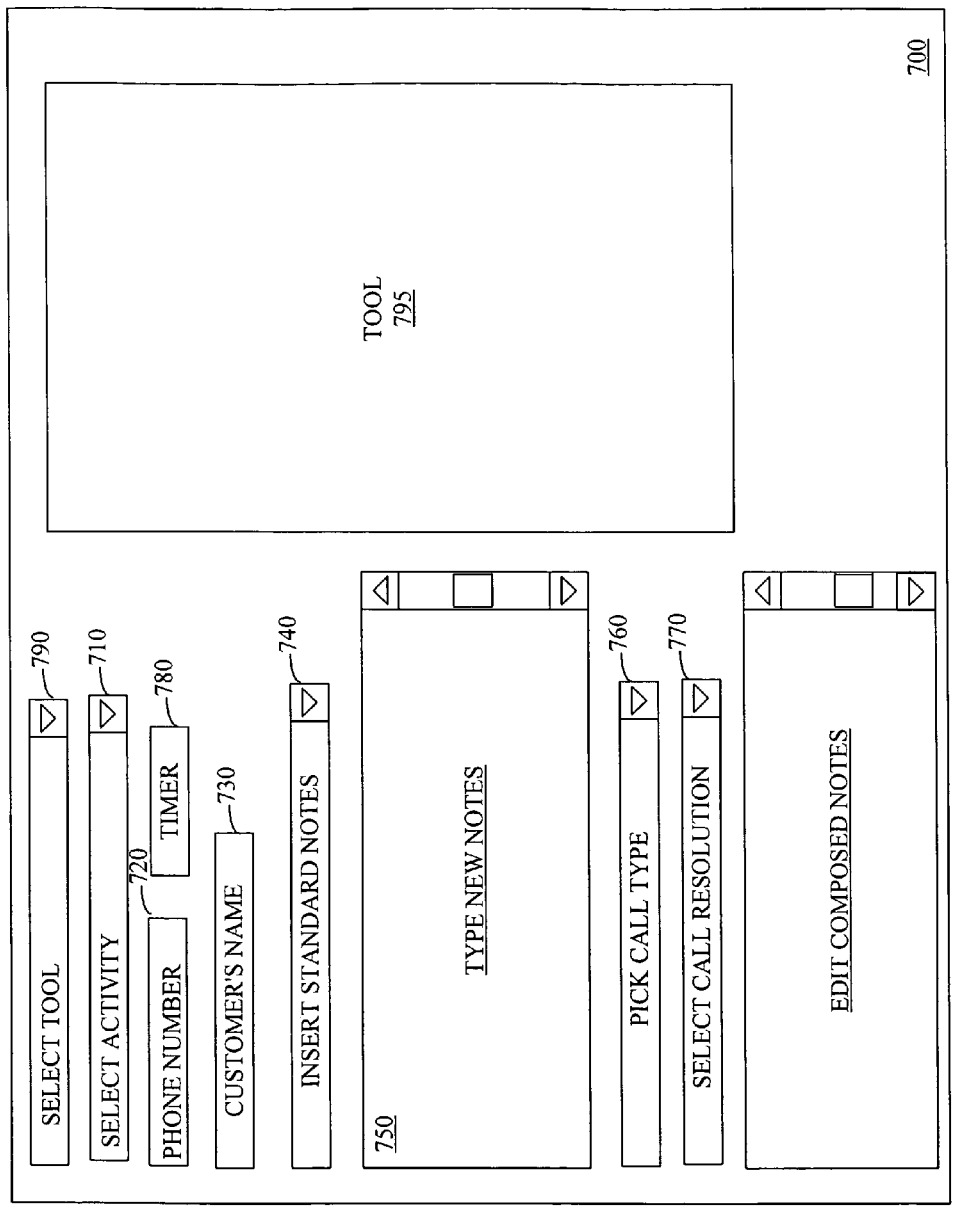
FIGS. 7-8 are diagrams illustrating one embodiment of an interface of a notation template tool of FIG. 2.

In some embodiments, a customer relations application launches a notation template tool 216, which is displayed to the user. Further, in some embodiments, the notation template tool 216 facilitates a uniform and standardized process of record-keeping under an established and accepted format by customer service agents within an organization. In this way, any customer service agent that follows a service call previously handled by the user can straightforwardly review and understand previous notes inputted by the user. One embodiment of an interface 700 of a notation template tool 216 is shown in FIG. 7

Via the notation template interface 700, the user is prompted to provide customer information and/or service information within fields represented by input boxes within the notation template interface 700. For example, the user may be prompted to select a campaign that categorizes the type of service calls the user is servicing in a particular session, via an input box (not shown). Further, the user may be able to select an activity code for a time keeping application via a dropdown input box 710. Further, the user may be prompted to specify a telephone number of a customer or other customer identification information, such as the customer's name, via input boxes 720, 730. A drop down box 740 may also be provided with standardized and commonly used descriptive terms and phrases that the user can select to use to record and describe a service call. Further, a free form text box 750 may be provided, so that a user may manually enter notes (via typing, for example) regarding the service call. Further, standardized options are also provided to characterize the service call, such as a dropdown box 760 of terms describing the type of call and a dropdown box 770 providing terms for describing the resolution of the call.

Aspects of the present disclosure help to provide continuity in the format of notes from one agent to the next. As the user provides information characterizing a service call via the notation template interface 700 and the call is completed (as indicated by an input of a description of the resolution of the service call), the information provided in the input boxes of the notation template interface 700 are composed and automatically recorded in one or more database records. For example, the notation template interface 700 parses information inputted into the interface and adds additional information (such as callback information, time usage information, agent/customer interactions, billing changes, etc.) and then stores this information in one or more databases that may be located in one or more remote locations.

Also, the notation template tool 216 may provide information to other computer tools utilized by the user. For example, in one embodiment, the notation template tool 216 is configured to launch a customer records tool automatically after the user provides a customer's telephone number within the notation template interface 700. In launching the customer records tool, the notation template tool 216 provides the user identification and password for the customer records tool from memory, so that the customer records tool displays with the current record of the customer being currently serviced. The user may then verify the customer's information on the customer record and return to the notation template interface 700 to enter his or her notes. In some embodiments, a notation template tool 216 may not be able to control activation of a computer tool and provide user identification and password information. For such cases, some embodiments load user identification and password information for the computer tool in a clipboard area of the operating system 212, such that a user can "paste" the information into the interface of the computer tool after the tool is launched by a command generated from the notation template interface 700.

Another computer tool that may be launched from the notation template interface 700 is a time keeping application. For example, in one embodiment, the notation template interface 700 features a dropdown input box (710), which allows the service agent to select an activity code for a time keeping application. Further, a timer mechanism 780 is also provided on the notation template interface 700 to launch a time tracking application to record time spent on a current service call without leaving the notation template interface 700. The duration of the service call as measured by the time tracking application is communicated to the time keeping application and/or other databases. Therefore, the notation template interface 700, in some embodiments, automatically updates external computer tools or applications after each service call is completed, as required by organizational procedures. Additional computer tools that may be launched from the notation tool interface are provided via a dropdown box 790, in some embodiments, of the notation template interface 700.

Figure 8:
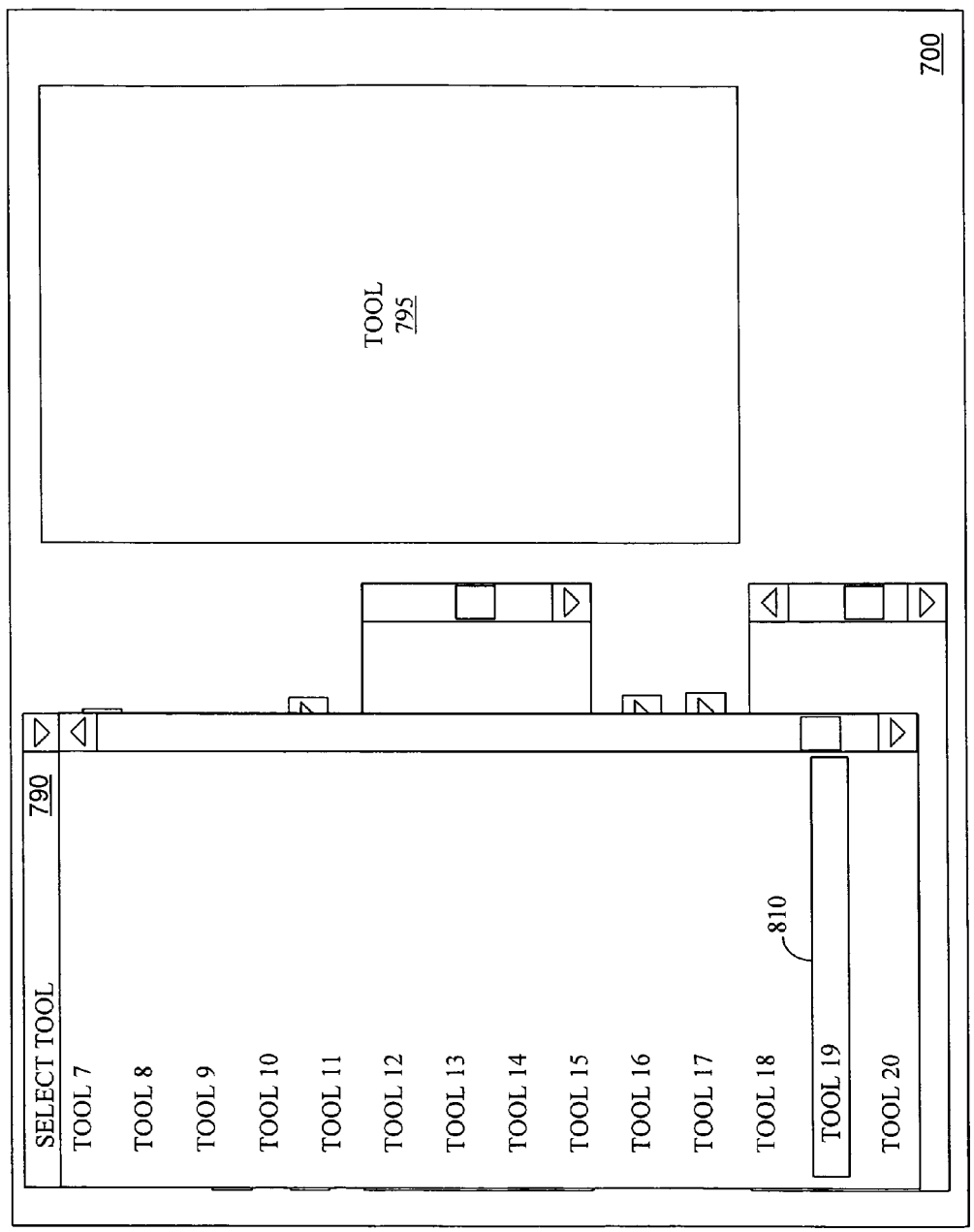
Figure 9:
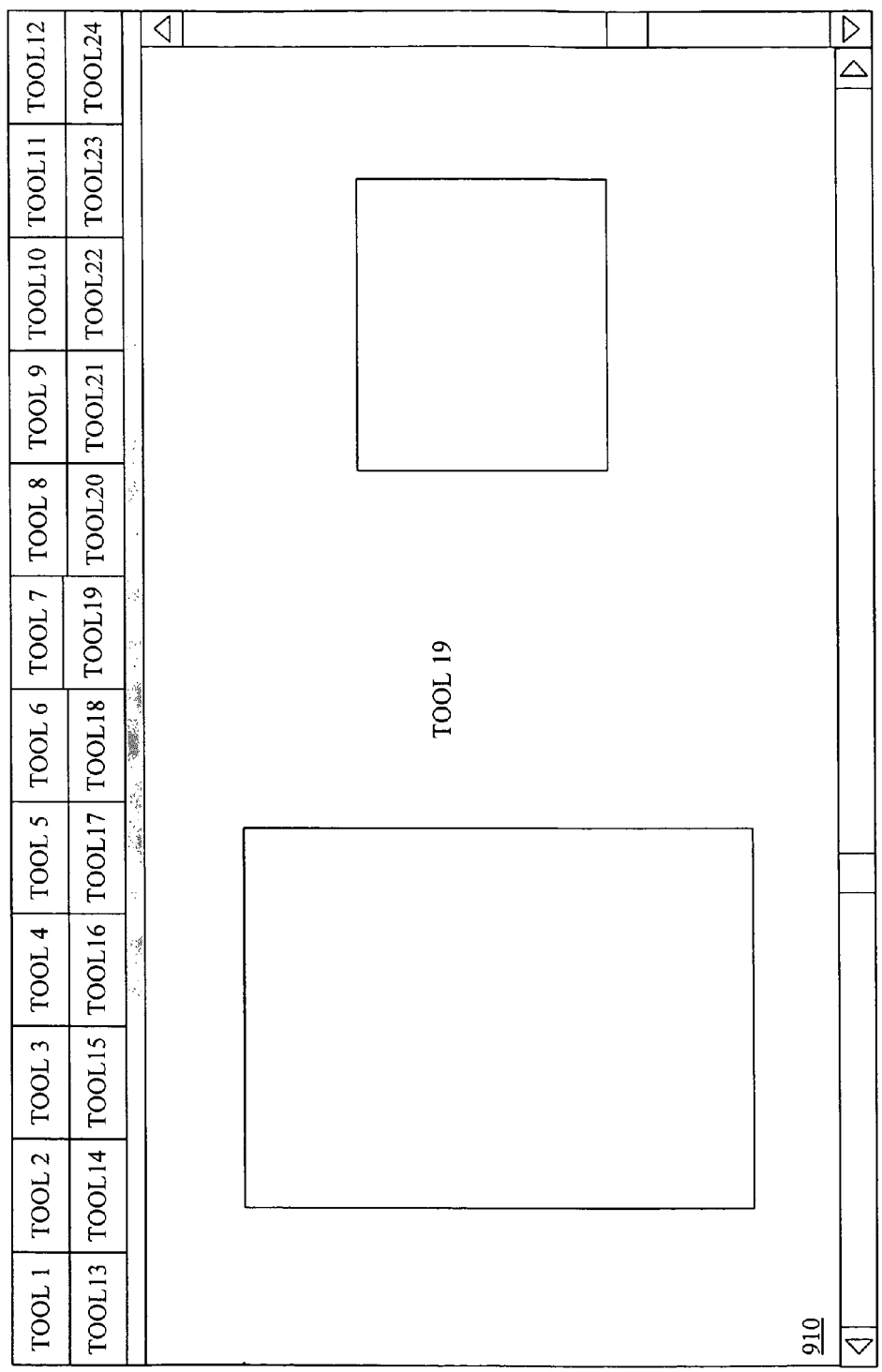
FIG. 9 is a diagram illustrating one embodiment of an interface of a computer tool launched by the notation template tool of FIG. 2.

Upon selection of a tool 810 from the drop box 790, as shown in FIG. 8, the notation template tool 216 retrieves user identification and password information for the selected tool from memory and launches the tool 910, as shown in FIG. 9, with the identification and password information, if possible. Alternatively, the notation template tool 216 stores the identification and password information in the clipboard area of the operating system 212. Also, in some embodiments, a computer tool interface 795 is displayed within confines of a window of the notation template interface 700, so that a user may monitor and verify contents of the tool while also viewing and interacting with the notation template interface 700. Illustrative examples of these processes are provided in later discussions.

Figure 10:
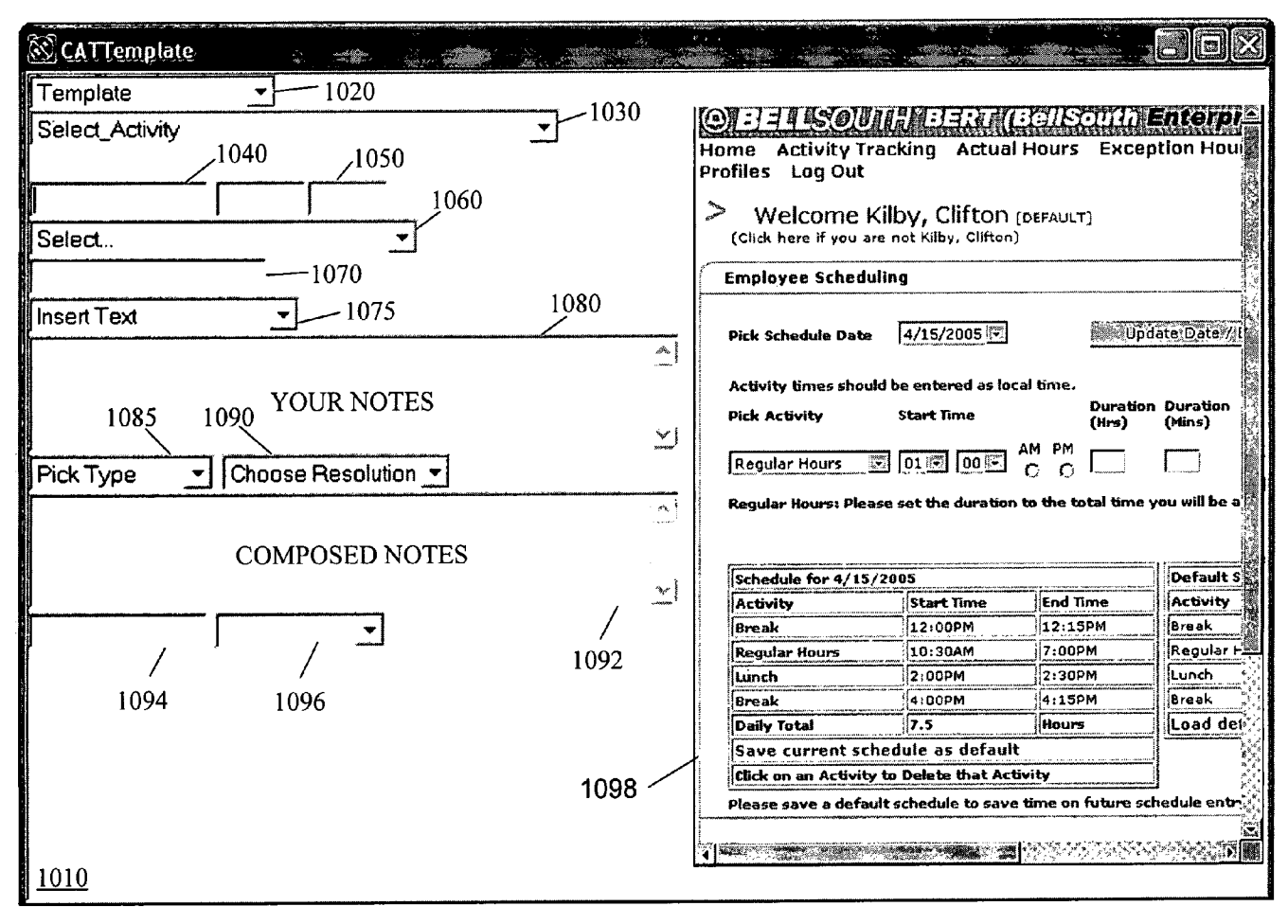

Next, FIG. 10 shows a screenshot of one embodiment, among others, of a notation template interface 1010 for one particular customer relationship management environment. As shown in FIG. 10, the notation template interface 1010 is titled "CATTEMPLATE" for this particular embodiment. At the top of the interface, a drop down 1020 box titled "Template" is shown. This "Template" interface control 1020 contains a list of computer tools from which a user may make a selection. Below the "Template" interface, another drop down box 1030 is featured. This drop down box interface 1030 is titled "Select Activity" and contains a list of time activity codes that a user may select to categorize activities being performed by a user, such as a customer service agent.

The CATTemplate interface 1010 further contains an input box 1040 to specify a telephone number of a customer. In some embodiments, entry of a telephone number is required by the CATTemplate interface 1010 before notation information is composed and communicated to one or more databases. Upon entry, a new telephone number that is entered or "pasted" is formatted into an easy-to-read format, such as (xxx) xxx-xxxx. The CATTemplate interface 1010 also copies the telephone number to the clipboard and upon receiving a "tab command" from the telephone number input box 1040, a customer record identified by the entered telephone number is automatically retrieved (via a customer report tool). In this particular embodiment, the customer report tool is referred as "CRM." In other embodiments, a different computer tool may be configured to be launched automatically from the telephone number input box 1040.

Further, another aspect of the CATTemplate interface 1010 is that a "double click" of an input box or field causes the contents of the box to be copied to a clipboard area of the operating system. Further, upon entry of a new telephone number in the telephone number input box 1040 and detection of a "TAB command" from the telephone number input box 1040, a timer mechanism is activated to track the duration of the service call starting at the point that the telephone number is logged on the interface. The current duration of the current service call for the entered telephone number is displayed on a timer interface 1050 within the CATTemplate interface 1010.

Since some customer service agents do not work on the same campaign over the course of the day, the CATTemplate interface 1010 also includes a drop down box 1060 to specify a current campaign. In general, a campaign is a collection of records that are worked by a service agent, and are broken out by customer type (e.g., residential or consumer) and customer statistics (e.g., frequency of disconnects, length of time offline, length of time online, length of time connected, length of time with provider, etc.). In some embodiments, the drop down box 1060 is set at a default campaign selection for the user, as may be specified in preferences for the user (and contained in user's encrypted password string). Therefore, if a user is working in his or her normal campaign as indicated in his or her preferences, the user does not change the selection in the drop down box. Otherwise, the user can make a new campaign selection using the drop down box 1060.

The customer's name may also be entered in an input box 1070, as shown in FIG. 10. By entering the current customer's name, the name is added to the notes that are composed at the end of a service call. Along with this information, descriptive phrases may be selected from the drop down box 1075 titled "Insert Text." On selection of a particular item in the list, the descriptive phrase is to be added to the notes that are composed at the end of the current service call. Also, text may be manually entered via the input box 1080 labeled "Your Notes." Therefore, at completion of the service call, information contained in this box is added to the notes that are composed at the end of the current service call. Further, by "double clicking" on the contents of the input box 1080, the contents of the box 1080 are added to the clipboard area of the operating system. In this way, a user could then "paste" the contents into another application, such as an email message, to a supervisor.

Additional service information may also be provided, such as a categorization of the type of service call performed by an agent via a drop down menu 1085, labeled "Pick Type" in the interface of FIG. 10. Further, after disposition of the service call, a descriptive phrase describing the resolution of the service call may be selected from the drop down box 1090 labeled "Choose Resolution." After selection of the resolution of the call, in some embodiments, the CATTemplate application (e.g., a notation template tool 216) composes notes from the information provided by the user and copies the notes to a clipboard and brings focus to the CRM application so that the user can copy the composed notes from the clipboard to an interface within the CRM application.

To monitor the information that is to be organized as notes by the CATTemplate application, the CATTemplate interface 1010 features an input box 1092 labeled "Composed Notes." This box 1092 shows the items the CATTemplate application has previously put in the clipboard. Double clicking the contents of this box 1092 copies contents of the box to the clipboard As additional elements, the CATTemplate interface 1010 further includes an input box 1094 for an email address of the customer being services. In some embodiments, after entering an email address in this box, the email address is copied to the clipboard and the CRM is brought into focus so that the email address may be pasted into an email field provided in the CRM interface. Note, in this particular implementation, the CATTemplate application is not able to control the CRM interface application by remotely providing information to the CRM application. However, in some embodiments, the CATTemplate application may be configured to activate and provide information to a computer tool directly without storing the information in a clipboard and having the user to paste the information in the interface for the computer tool.

Figure 11:
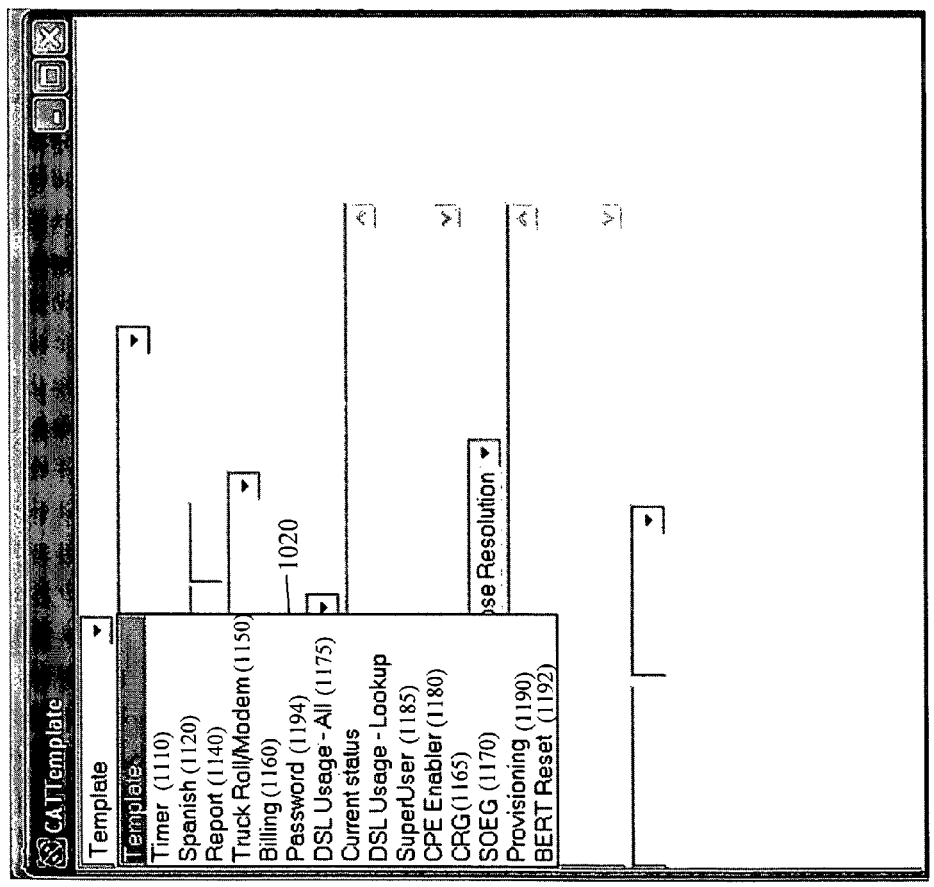
FIG. 11 is a screenshot display of one embodiment of a notation template tool interface of FIG. 10.

The last mechanism 1096 shown on the CATTemplate interface 1010 is an interface for changing the background color of the interface by selecting a different color scheme or style. Also, of note, is the computer tool interface 1098 that is displayed within the confines of the window of the CATTemplate interface 1010. Next, the various drop down boxes featured in the CATTemplate of FIG. 11 are examined. Note, in this example, the computer tool interface 1098 is configured to not be displayed within the confines of the window for the CATTemplate interface 1010.

Figure 12:
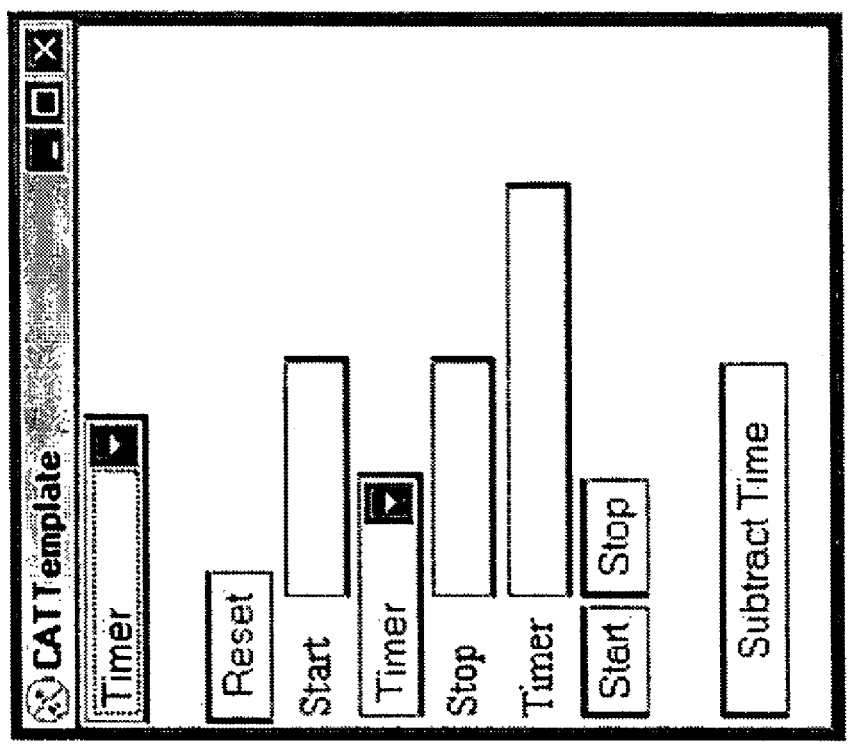

In FIG. 11, the available options in the CATTemplate drop down box 1020 are shown. The available options include different computer tools that a user often has to login to use. For example, a "Timer" tool 1110 enables a customer to track exception and lost time by starting a timer mechanism while the user is away from his or her station, as shown in FIG. 12. Note that the interface for the timer tool is shown within the window of the CATTemplate application. In some embodiments, computer tools share a similar architecture (e.g., an HTML construct, including Hypertext Applications (HTA)) with the CATTemplate application, and thus are capable of being controlled by the CATTemplate application. Such tools may be referred as internal tools. Otherwise, computer tools that have a dissimilar construct than the CATTemplate application are rendered on a computer display within their own window control or interface.

Figure 13:
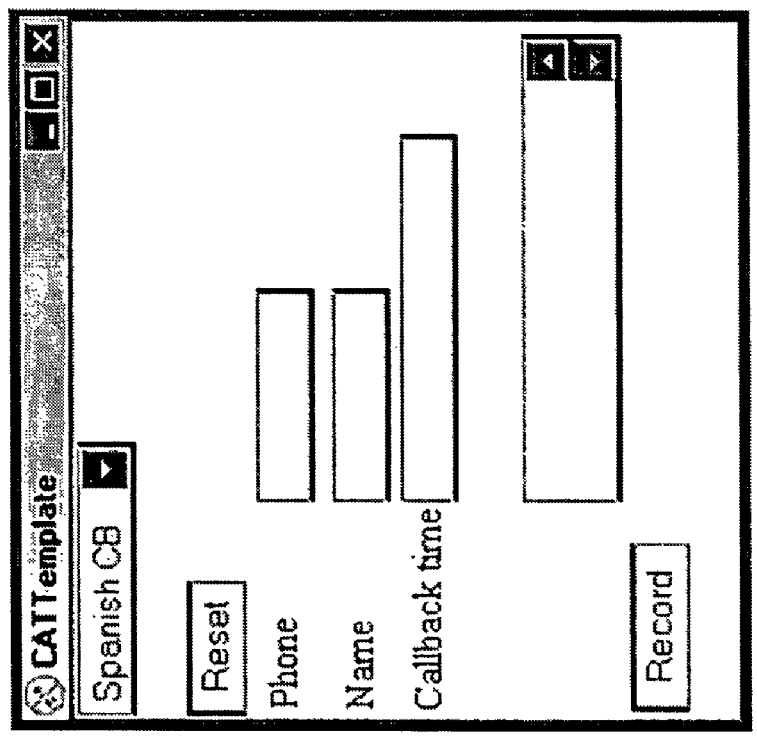

Another tool referenced in the drop down list is "Spanish" 1130. It will be appreciated that this tool may also reference other languages. This tool is used to set up callbacks to customers requiring a non-English speaking agent. For example, customer service agents placing outbound calls to Spanish speaking customers request for a Spanish speaking specialist to call the customer back. Using this tool, a request is sent to a Spanish callback database that is serviced by a Spanish-speaking agent. Those particular Spanish-speaking agents utilize an interface to access the Spanish Callback database which alerts them when a new call back request is added. With selection of the "Spanish" tool from the CATTemplate interface 1010, the telephone number and any other customer information is automatically filled in appropriate fields of an interface of the Spanish callback database. One embodiment of an interface to the Spanish callback database is shown in FIG. 13.

Figure 14:
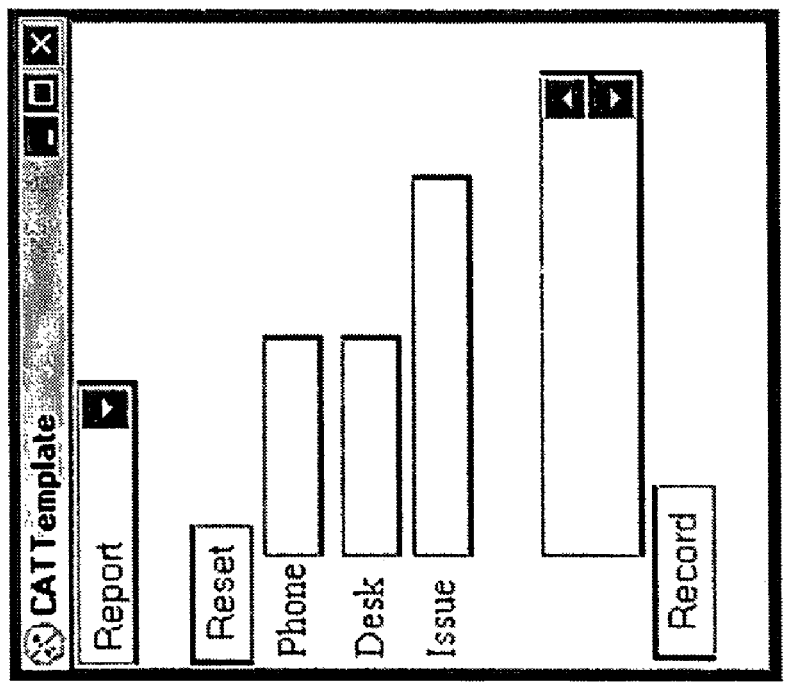
Figure 15:
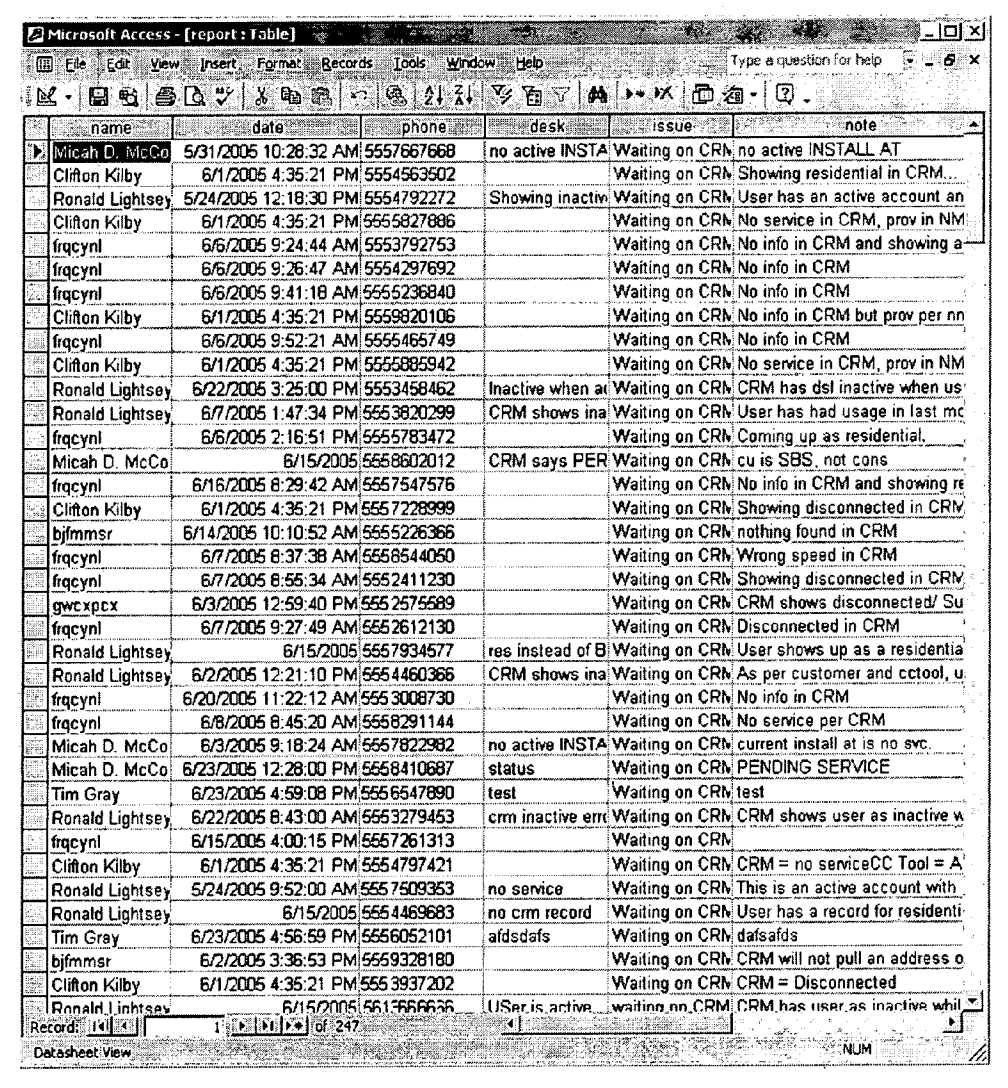

To report problems with a helpdesk or to record a reoccurring issue, a user may select the "Report" tool 1140. Instead of sending an email to a supervisor, for example, a customer service agent can have the telephone number from the CATTemplate interface 1010 copied and added to an interface for making a report that is accessed by the appropriate persons who are authorized to correct the issue. An example interface for the Report tool is shown in FIG. 14, and an example report is shown in FIG. 15.

Figure 16:
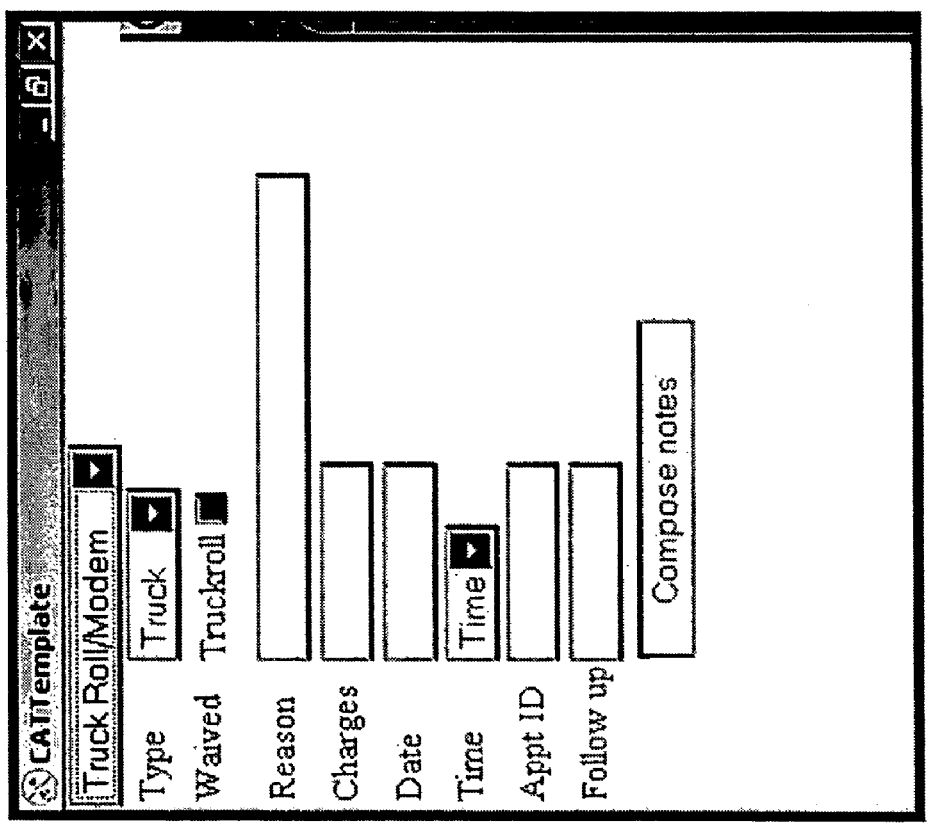

To record a truckroll or modem order for a DSL service call, the "Truck Roll/Modem" tool 1150 may be selected. After which, a form for completing a Truckroll or modem order is displayed to the user so that notes detailing the order may be recorded in notes by the customer service agent. An example interface is shown in FIG. 16.

Figure 17:

To record a billing credit for a customer, the customer service agent may select the "Billing" tool 1160. In response, an interface to a standalone Access® database (from Microsoft), in one embodiment, is used to record credit requests for customers. In one embodiment, the interface provides a direct connection to a billing credits database (that is ODBC compliant) using an HTML form without switching focus from the CATTemplate interface 1010, or having to load Access® directly. An example interface to the billing credits database is shown in FIG. 17, and an example report is shown in FIG. 18.

Figure 19:
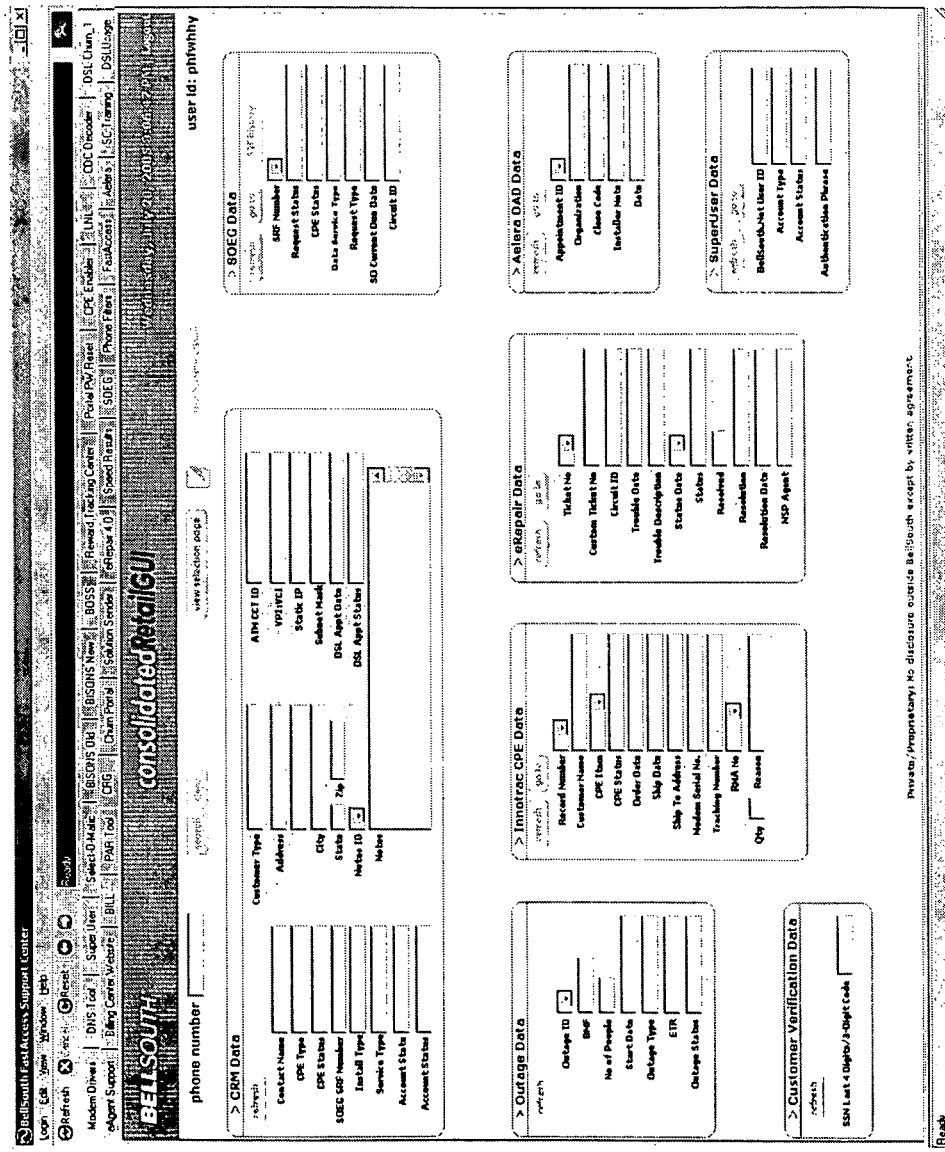

Another tool provided from the CATTemplate interface 1010 is a conglomerate application tool referenced as "CRG" 1165. Upon selection of the CRG tool, the telephone number from the CATTemplate interface 1010 is used to look up assorted sets of data from various databases, namely a collation of the customer information database (CRM), customer billing records, customer provisioning records, and current repair issues in a web based utility. In this particular example, as shown in FIG. 19, CRG does not actually log into all of the displayed systems, it just connects to the database and pulls the information from the systems (that are ODBC compliant, in some embodiments). Further, in the example shown, CRG is launched from a tabbed web browser that also includes tabbed mechanisms for launching additional web pages accessed by the customer service agent.

Figure 20:
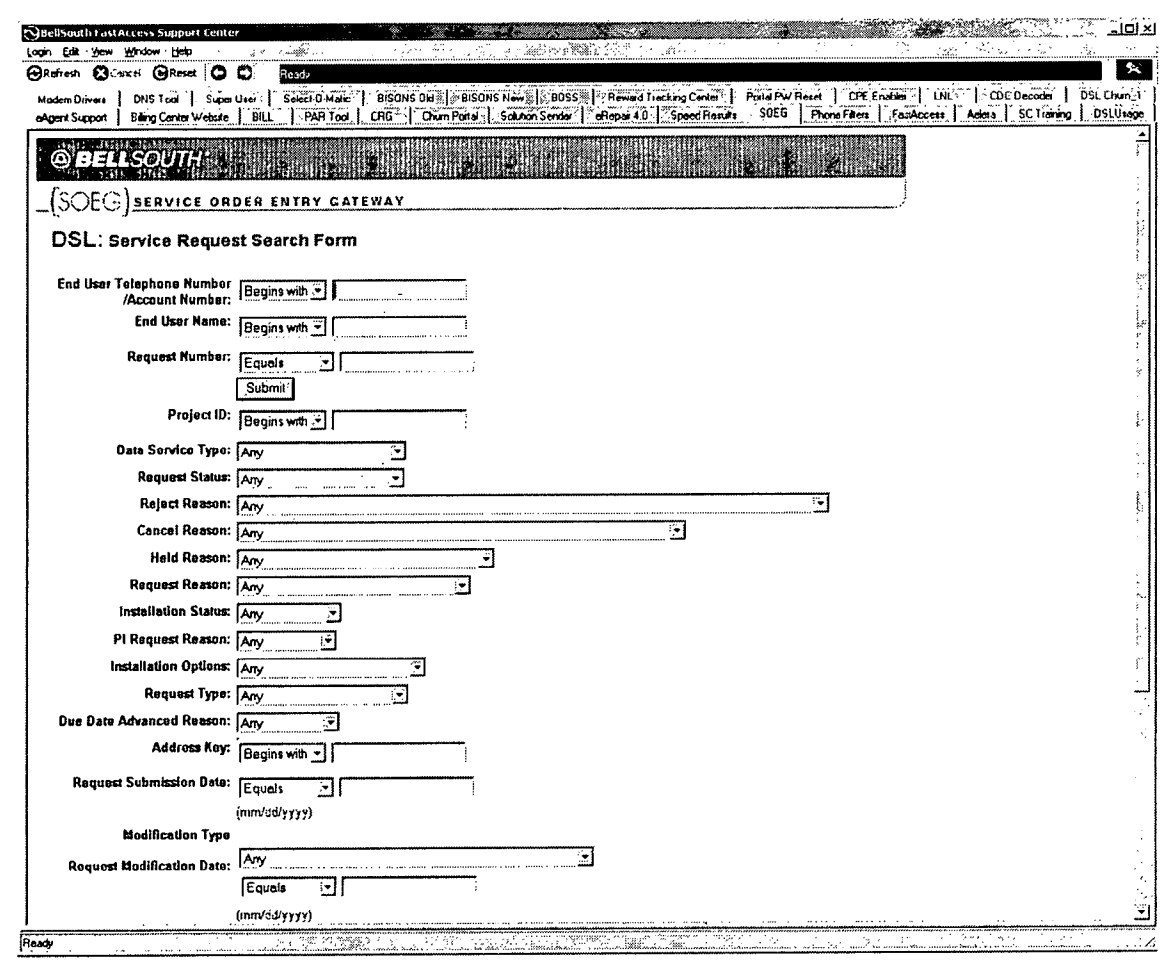
Figure 21:
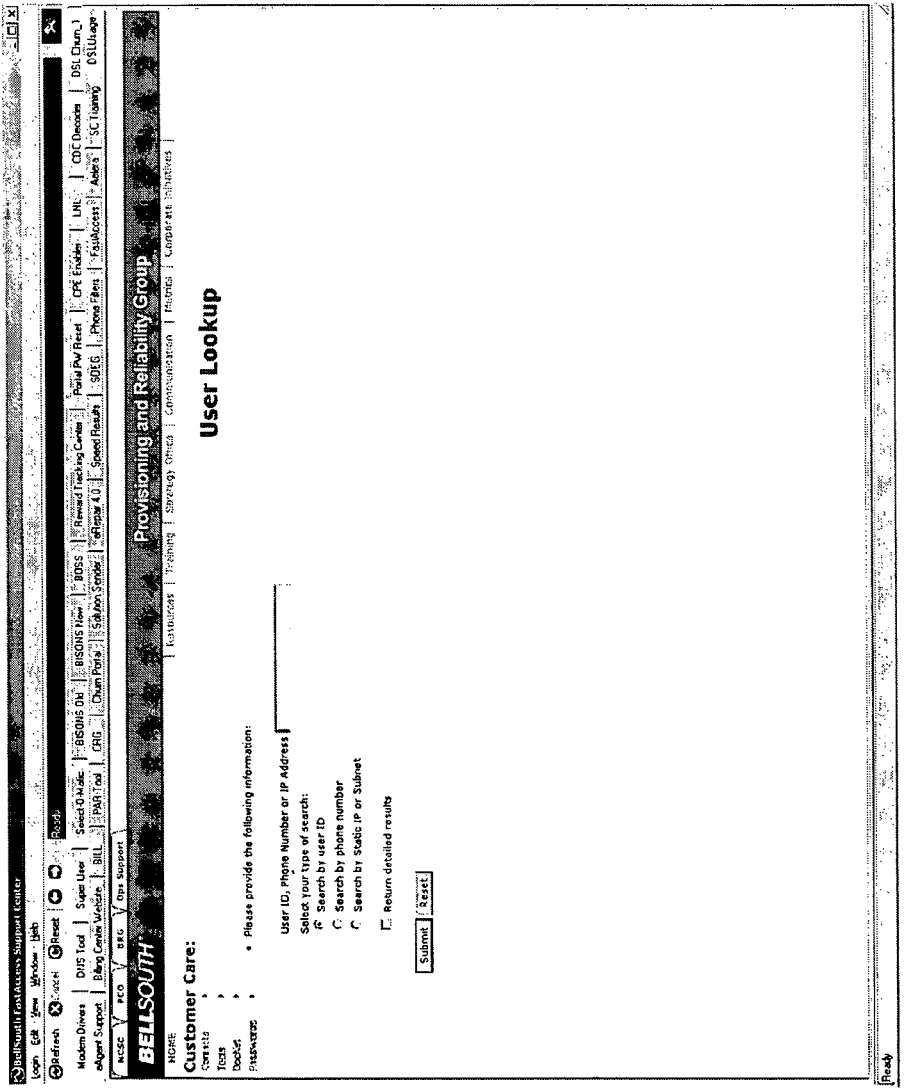
Figure 22:
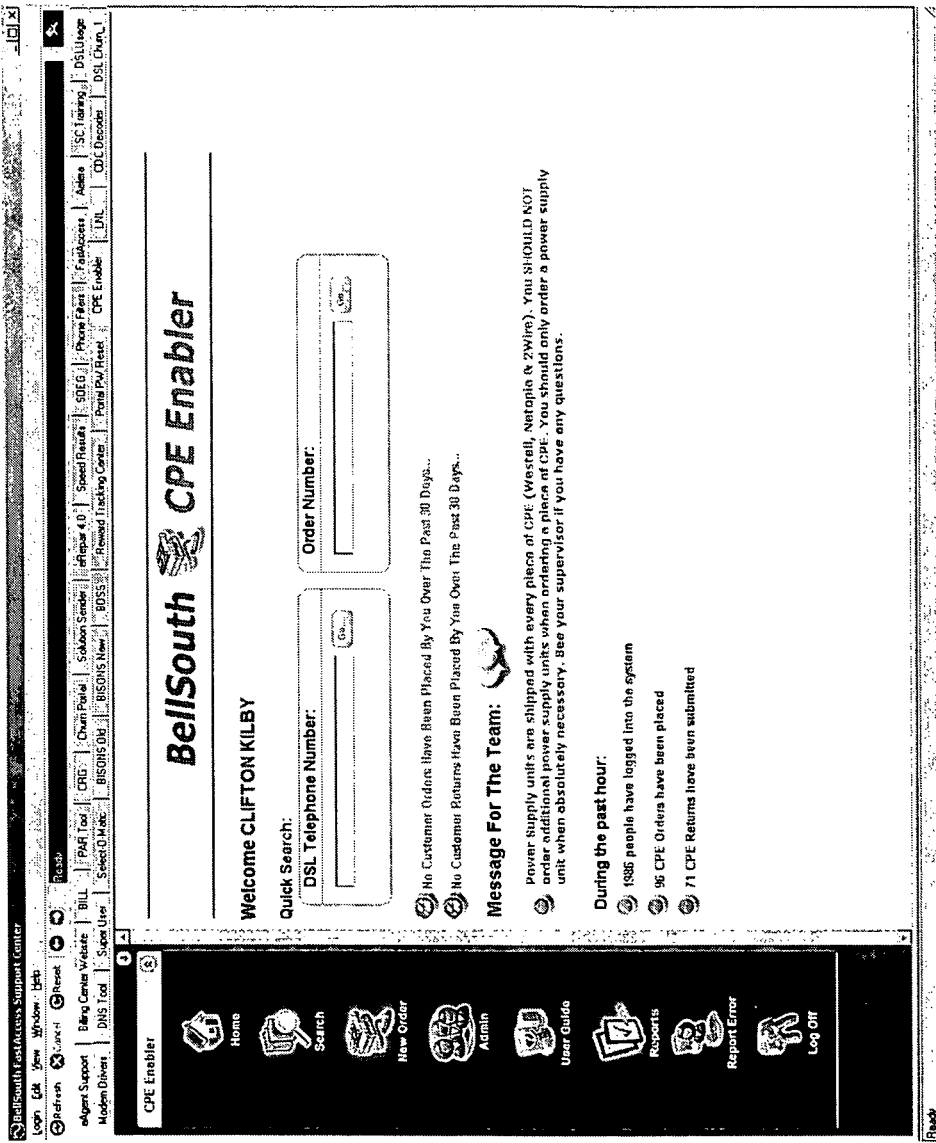
Figure 23:
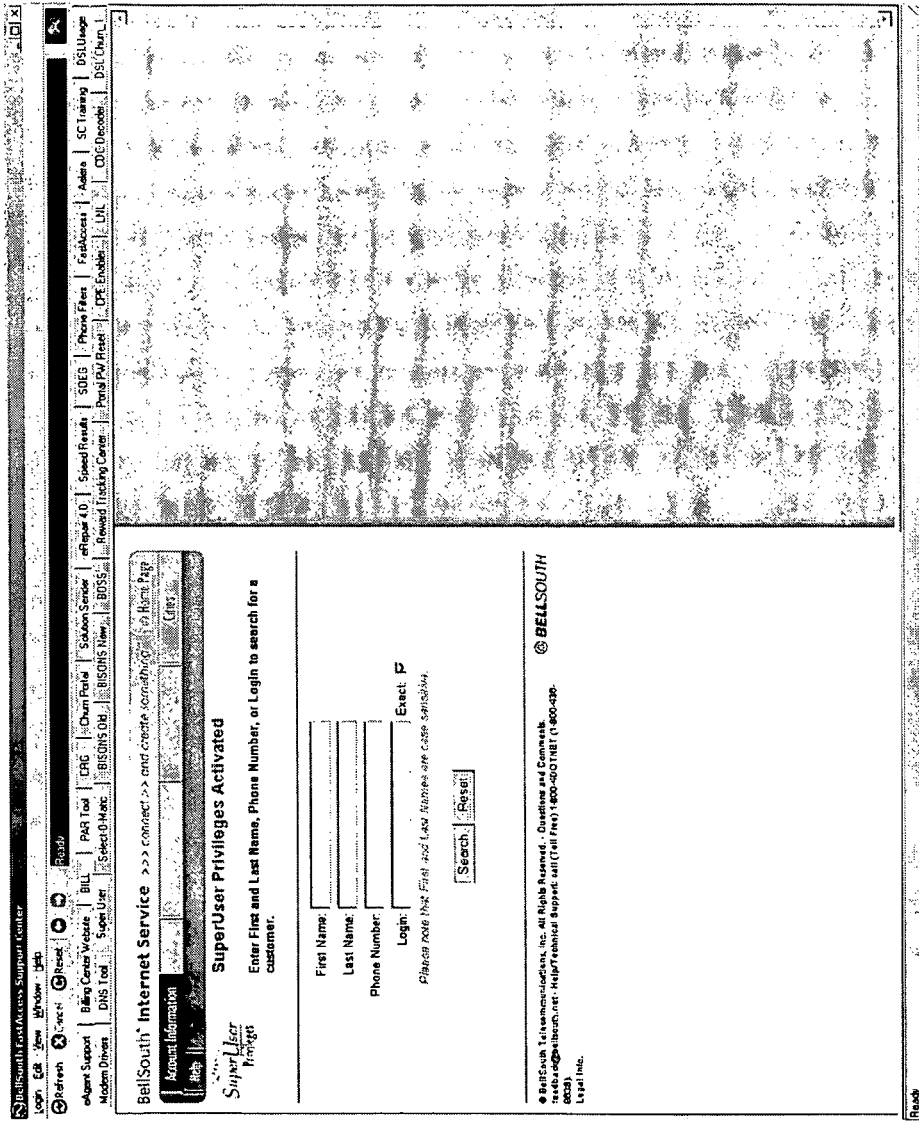
Figure 24:
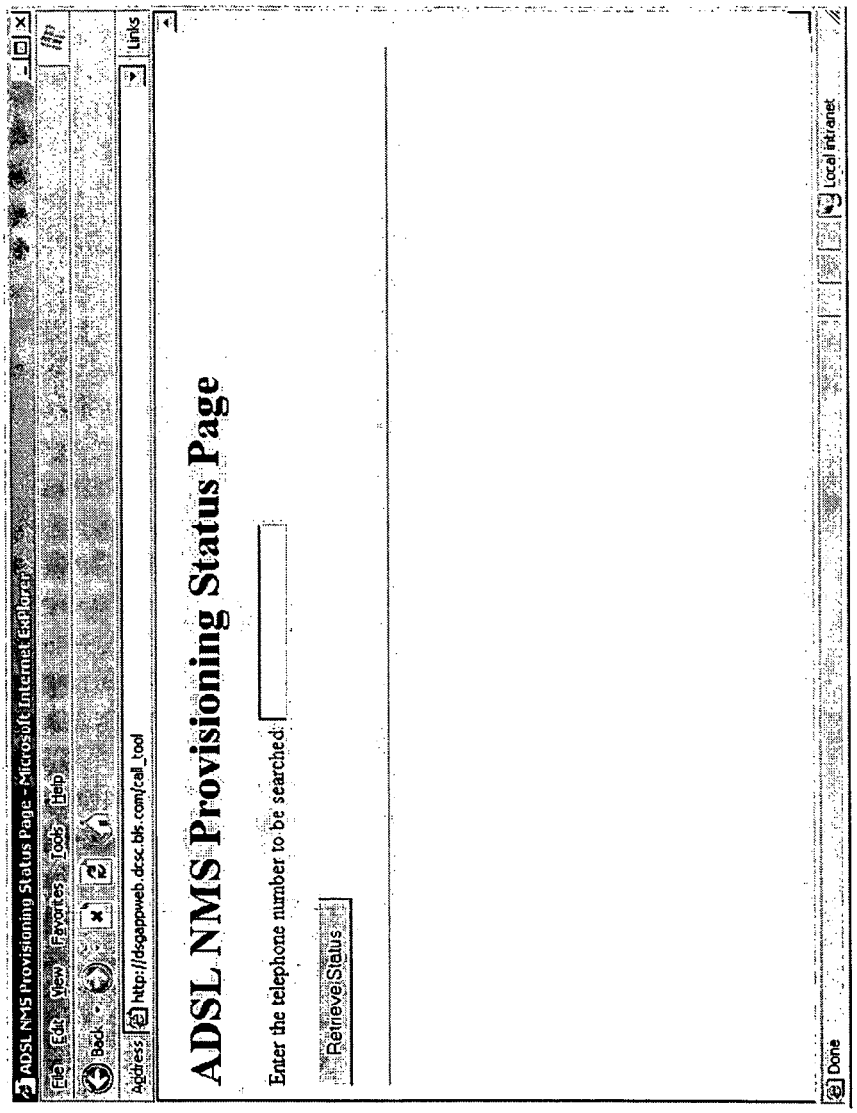
Figure 25:
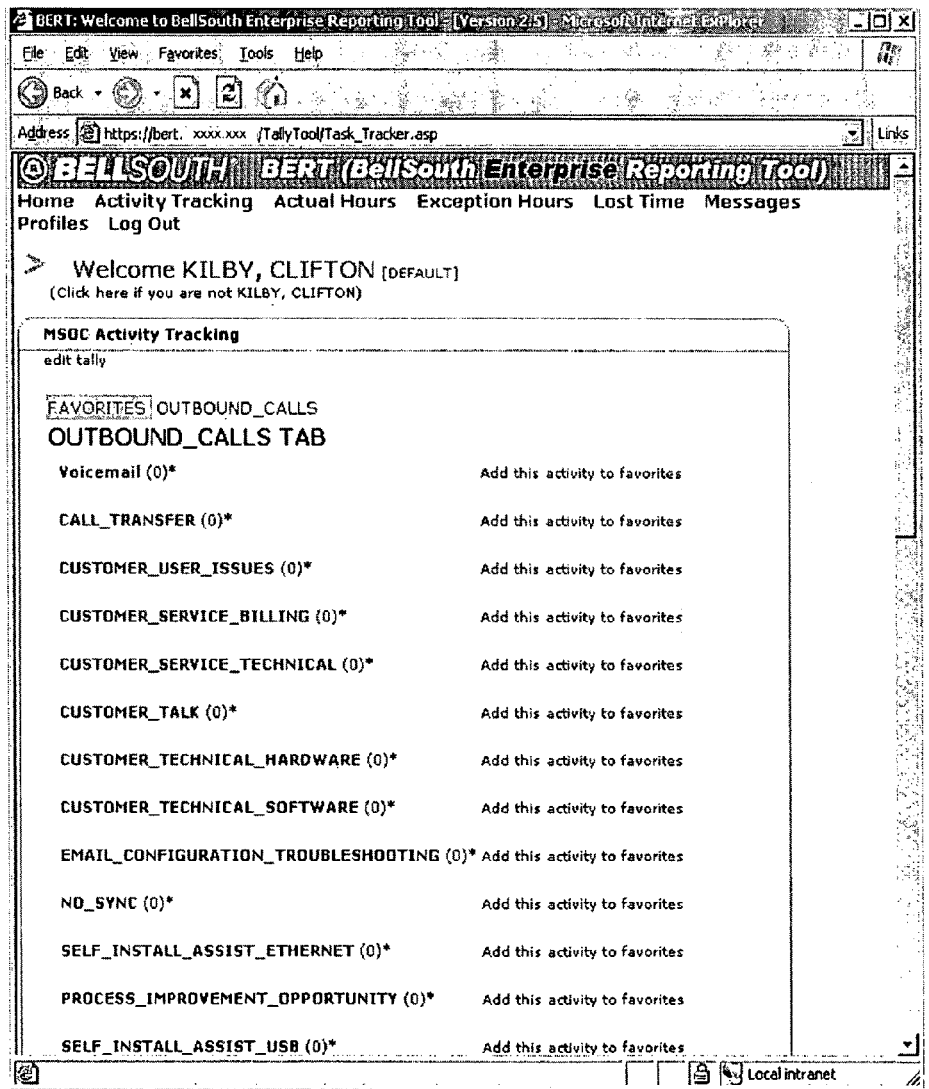

A "SOEG" tool 1170 may also be selected to activate a web-based interface for a service request form, as shown in FIG. 20. The SOEG tool uses a telephone number to look up a service request form. Similarly, a "DSL Usage" tool 1175 uses the telephone number or email address from the CATTemplate interface 1010 to look up DSL usage, as shown in FIG. 21; a "CPE Enabler" tool 1180 uses the telephone number to look up orders for customer premises equipment, as shown in FIG. 22; a "SuperUser" tool 1185 uses the telephone number or email address to look up a customer with "super user" status, as shown in FIG. 23; a "Provisioning" tool 1190 uses the telephone umber to look up network management system (NMS) status, as shown in FIG. 24; and a "BERT Reset" tool 1192 causes a time keeping application to reset, as shown in FIG. 25. The BERT tool is discussed below.

Figure 26:
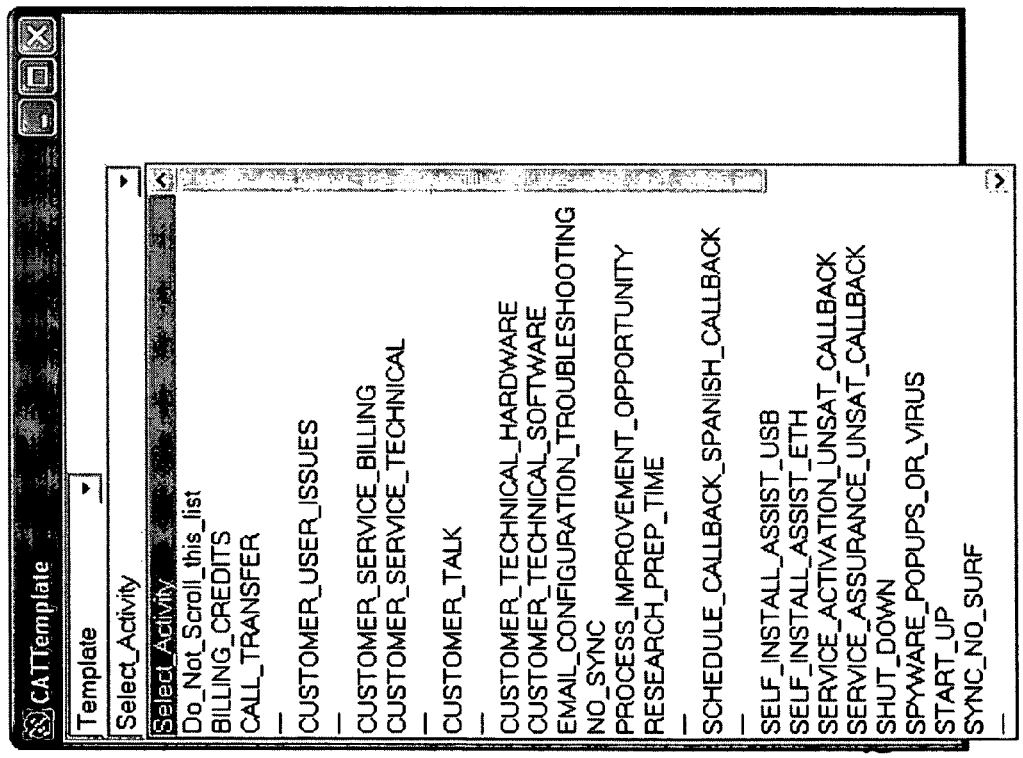
FIGS. 26-30 are screenshot displays of the notation template tool interface of FIG. 10.

Next, FIG. 26 shows the list of options available from the "Select Activity" drop box 1030 of FIG. 10. These include activity or time codes for various tasks performed by a customer service agent, in this particular example. Selection of an activity code is configured, in some embodiments, to activate or bring into focus the time keeping application, which is referred to as "BERT" in this implementation. For example, in some embodiments, the BERT tool or application is a time keeping application for tracking and logging a user's time.

Figure 27:
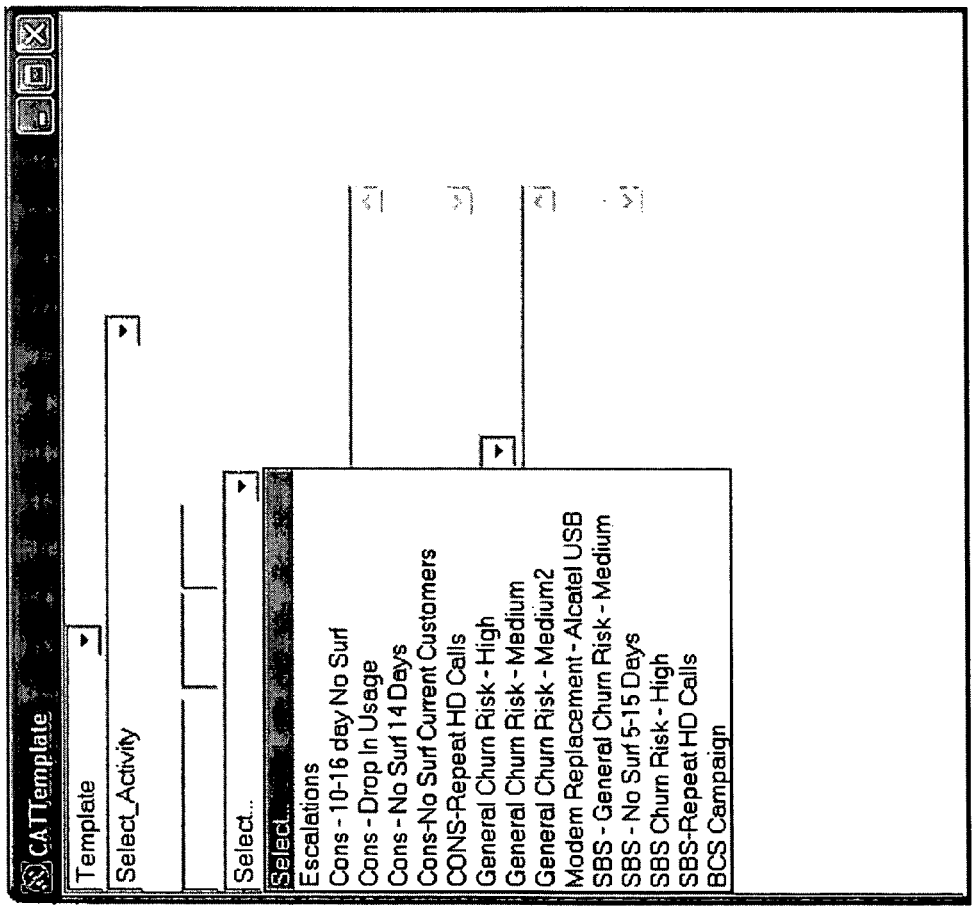
Figure 28:
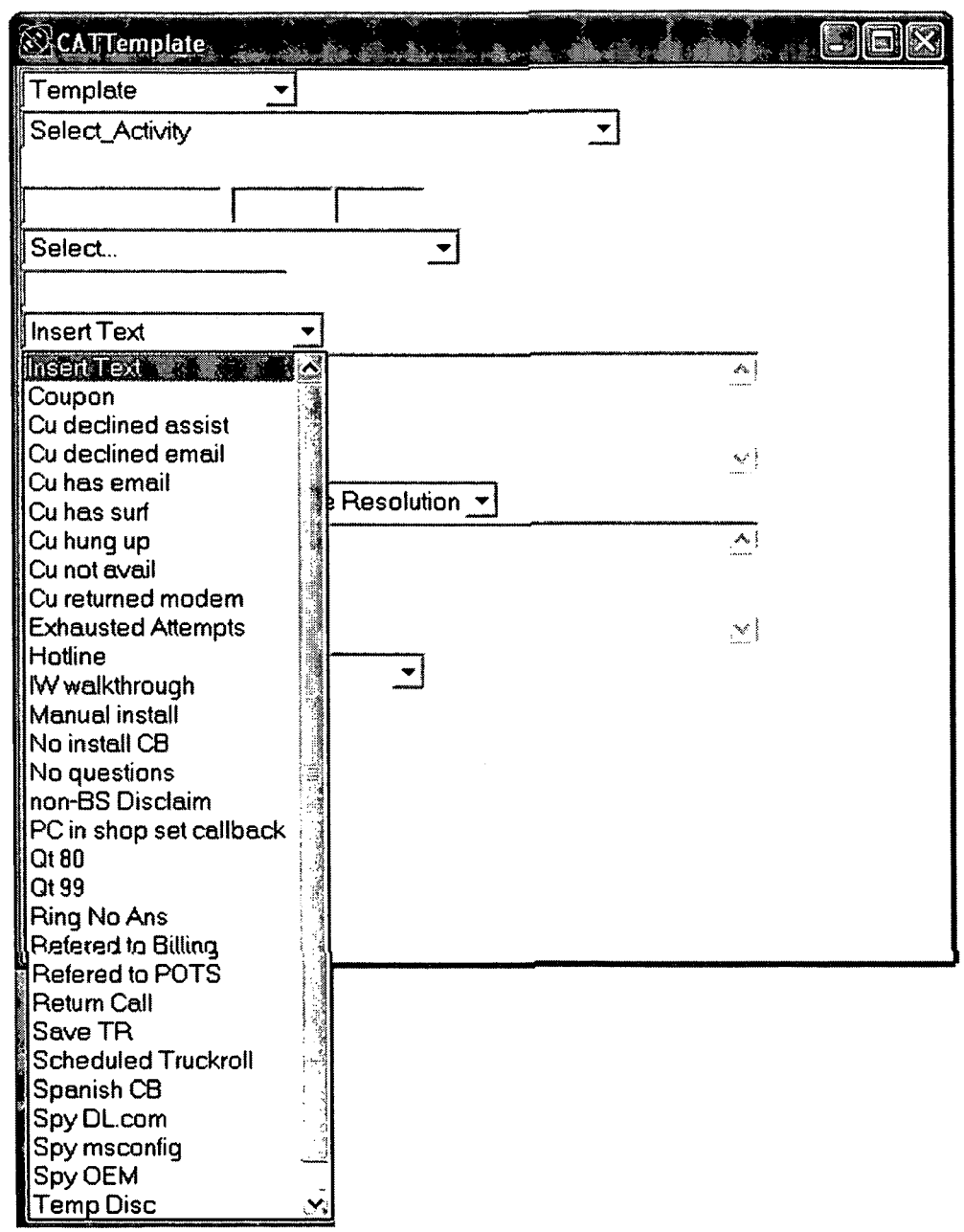
Figure 29:
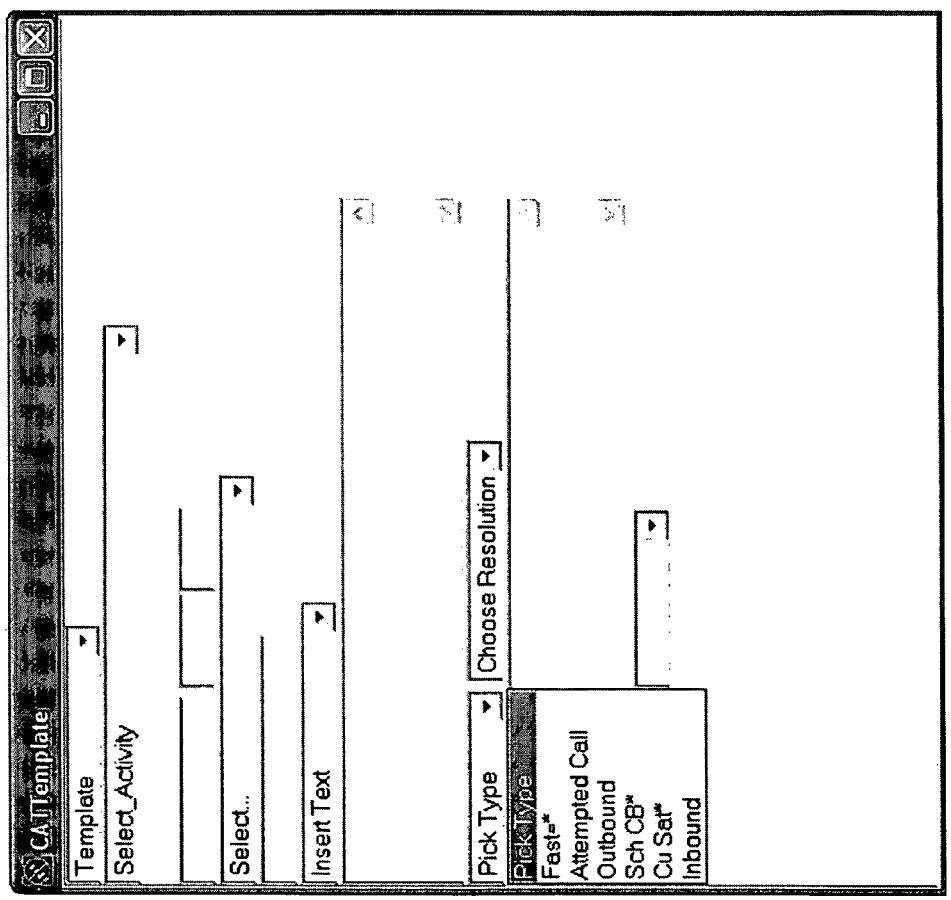
Figure 30:
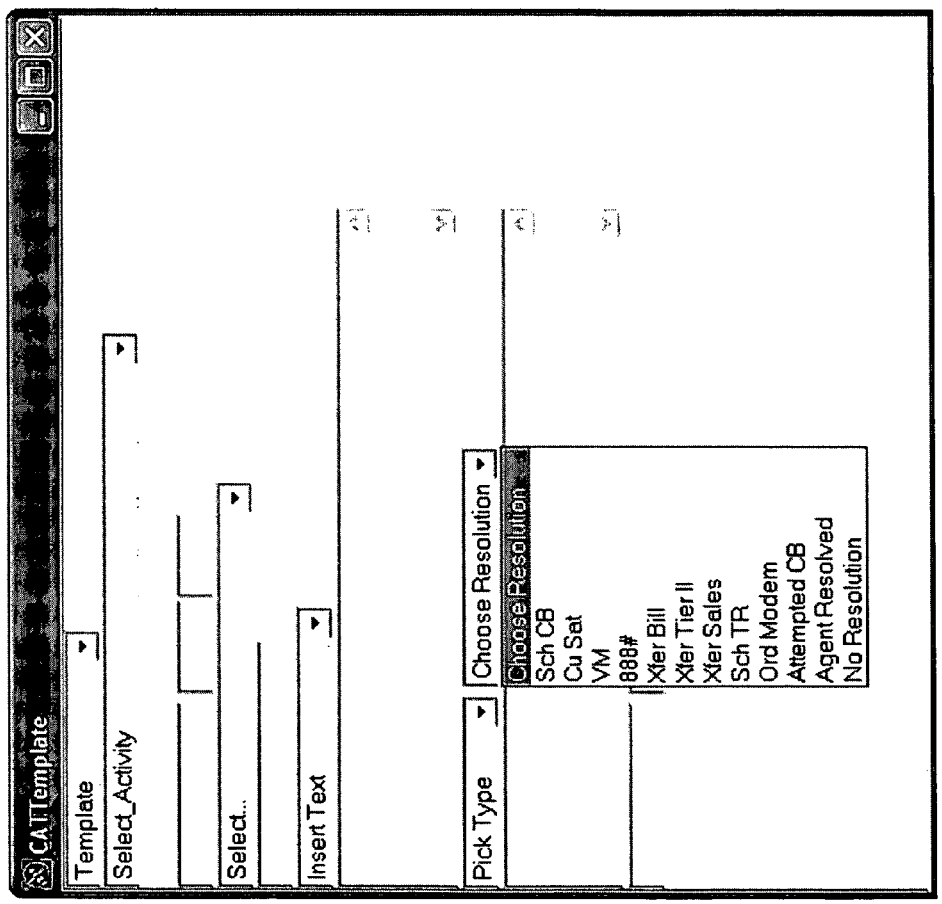

In FIG. 27, the drop down list for the "Select" interface 1060 is shown, where the current campaign assignment is selected, as previously discussed. Similarly, in FIG. 28, the drop down list for the "Insert Text" interface 1075 is shown, where descriptors for notes are selected, as previously discussed. In FIG. 29, the drop down list for the "Pick Type" interface 1085 of FIG. 10 is shown, where a descriptor of a service call is selected, such as outbound call, scheduled call back, customer satisfied, etc. For some selections, the CATTemplate application automatically composes notes and copies the notes to the clipboard, while the CRM application is brought into focus, in response to the selection of type of call that has only one resolution for the call (e.g., Customer Satisfied, Schedule Callback, etc.). Otherwise, a resolution is chosen from the dropdown list of the "Choose Resolution" interface 1090 of FIG. 30. A selection of an option from the Choose Resolution dropdown list is required before notes are composed and stored in appropriate databases.

Figure 31:
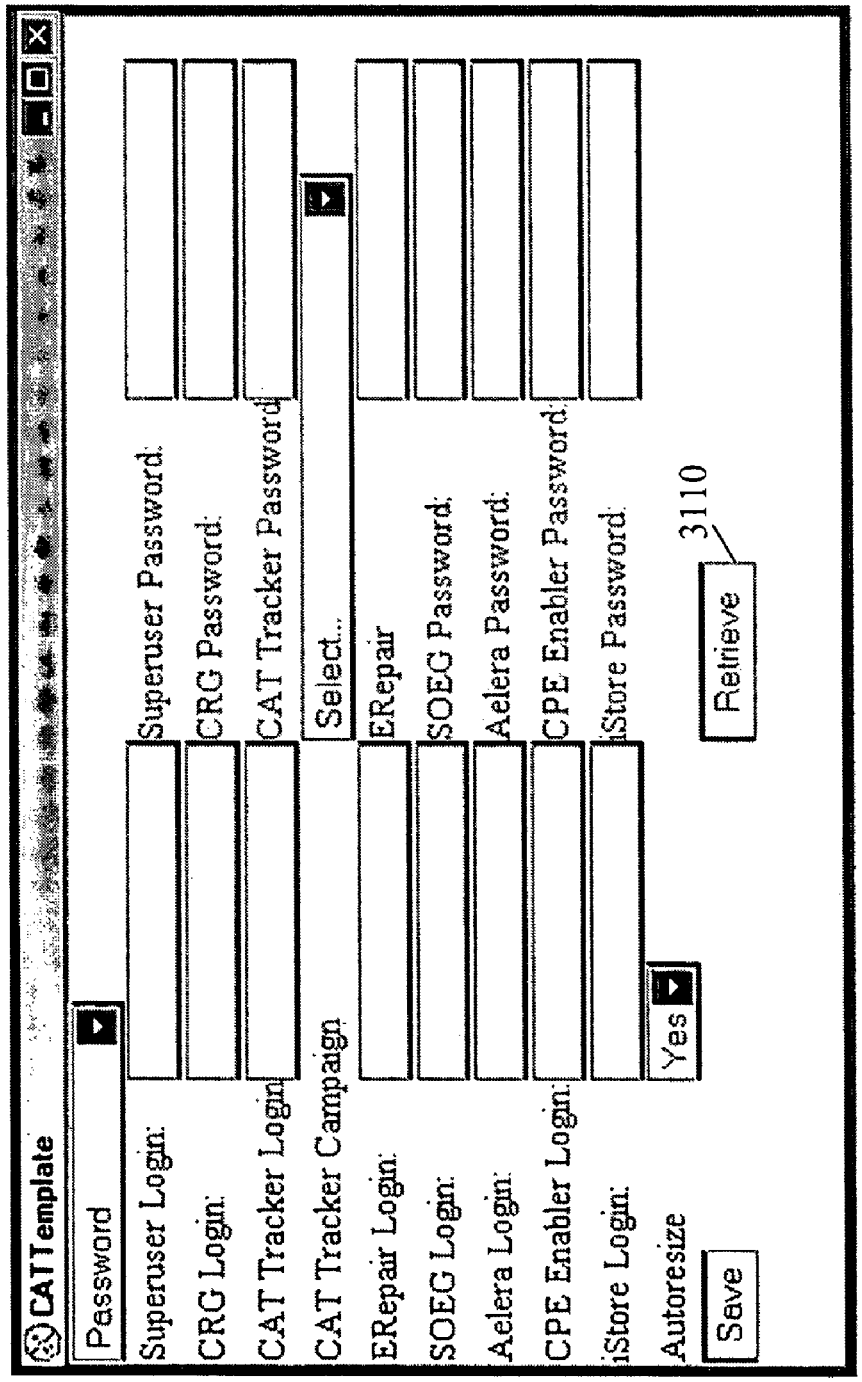
FIGS. 31-32 are screenshot displays of one embodiment of interfaces of the password manager application of FIG. 2.
Figure 32:
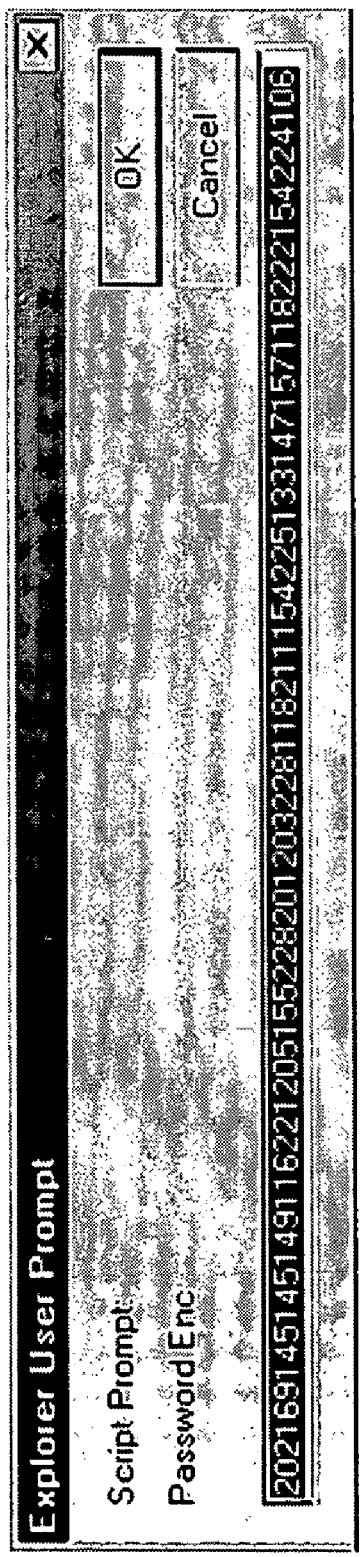

Referring back to FIG. 10 and the "Template" dropdown list 1020 of computer tools, one of the listed tools 1194 is "Password" which refers to one embodiment of a password manager, as previously described with regard to FIG. 6. One implementation of a password manager interface is shown in FIG. 31. After selecting the RETRIEVE button 3110, a prompt is displayed, as shown in FIG. 32, to enter the user's encrypted password string. After which, the user is prompted for his or her encryption key (not shown), and the password manager interface is populated with the user identification and passwords of the user. The passwords and user identification information are then used to log the user into computer tools, as needed. Also, note with the password manager interface of FIG. 31, a user may select a preference with regard to an "Autoresize" option. In some embodiments, the time keeping application (e.g., a "BERT" tool that is subsequently discussed in the present disclosure) is displayed as a companion piece or display next to the CATTemplate interface 1010, if desired. To turn this option on, the user can select "No" as the option for the Autoresize dropdown box. Otherwise, if the user selects "Yes," then the window control for the CATTemplate interface 1010 is resized to only show the contents for the CATTemplate interface 1010.

Consider the following routine that may be practiced by a customer service agent in accordance with one embodiment of the present disclosure. The customer service agent begins by logging into the CATTemplate application and provides his or her name. Further, the agent inputs his or her encrypted password string to further provide user identification information, passwords, and preference information via the CATTemplate interface 1010. The customer agent also specifies campaign information, and as the agent is working on a call, the agent puts in a telephone number into the CATTemplate interface 1010 and timing keeping information.

If the agent forgets to input time keeping information, the CATTemplate interface 1010, in some embodiments, warns the agent (via an audio alert) but is not required, since not all service calls need time keeping information. If an agent needs to input lost time, such as for attending a meeting, the agent indicates when the meeting started (e.g., at 2:40 p.m.) and ended (e.g., at 3:45 p.m.); that the meeting was an exception type (e.g., administrative task) via the CATTemplate interface 1010. The CATTemplate interface formats this information (e.g., calculates duration of call) and provides the information to a time keeping tool that tracks and records an agent's time information. In some embodiments, an interface to the time keeping application is visibly displayed within the frame of the CATTemplate interface, so that users may visibly confirm that time keeping information is being recorded. However, a user may choose to hide the display of the time keeping interface by configuring his or her preference settings, as previously discussed.

Tabbing out of the telephone number field of the CATTemplate interface 1010 automatically copies the telephone number, reformats the telephone number into a format accepted by a CRM tool, opens, and then focuses the desktop on a CRM tool where the agent records customer interaction. At the interface for the CRM tool, the agent then "pastes" the telephone number into interface of the CRM tool and a record is pulled (if a record is present for the telephone number). After reviewing the record, the agent "tabs" back to the CATTemplate interface 1010 and troubleshoots the call and records call information via the CATTemplate interface 1010.

Since, for some embodiments, the CATTemplate interface 1010 is unable to remotely provide input commands to some computer tools, such as the CRM application, the CATTemplate application composes notes for the agent to paste into other tool interfaces by writing the notes in the clipboard of the operating system 212. The composed notes in the clipboard area may have date, time, telephone number, problem description, resolution, agent identification, departmental identification information, etc. automatically formatted within the note.

Also, within the CATTemplate interface 1010, an agent may "double click" on input fields to copy the contents of a field to the clipboard, so that the contents may be pasted to another application. For example, if content from the "Your Notes" field 1080 is "double clicked," then the contents of the field are added to the clipboard, so that the agent may, for example, paste the notes in a text document. Note, that the contents in the clipboard do not have the additional information (agent name, time information, etc.), when they are moved to the clipboard from the "Your Notes" field 1080.

After reviewing the customer's record, the agent may choose to view special orders issued for the customer, so the agent uses the CATTemplate interface 1010 to select the SOEG tool. The CATTemplate then records inputted information in a database dedicated to the SOEG tool before bringing an interface of the SOEG tool into focus. Also, if the agent chooses a resolution for the call, such as one indicating that the agent left a voicemail message for the customer, the information is recorded in a database without user direction.

By reviewing database records, a supervisor or other interested user may then view that when the agent made a voicemail tally; when the call started; when the call ended; the telephone number that was being worked on; notes entered; the campaign being worked, etc. Therefore, instead of collecting all of this information from separate call statistics records, agent notes in CRM records, etc., a supervisor may access this information which has been compounded into one source, although the information is still being recorded separately in other databases.

Via the CATTemplate application, a single record may be configured to contain more useful information in one record than the other reports prepared by other tools. For example, a report may be configured with a summation of what every agent has done over a course of a day, across different applications and tools. Otherwise, a supervisor would have to pool a report from every application or tool.

Records maintained in some embodiments include tables with information from calls broken down by day and department or organizational unit. The unit information comes from a separate database, such that every time an agent logs into the database, it checks his or her user-id which the agent put in when he or she logged into a computer; the name he or she put in to start a customer service application; the unit information which is put in by the supervisor; and the last time the agent logged into the application. It collects that information and prepares daily reports of the agent, what he or she did on the call, when the call started and stopped, the phone number being serviced, any notes recorded, and what campaign it was on, and it has ability to record multiple tallies per call. Further, in one embodiment, the CATTemplate application has a dedicated SQL (Structured Query Language) database which generates real time call handling statistics, called CRS, to which the supervisors and agents have access. FIG. 33 shows an example CRS report.

In some embodiments, the notation template application or tool 216 (e.g., CATTemplate application) uses several other programs to implement its functionality. The notation template tool 216 may be written in a combination of HTML (HyperText Markup Language), CSS (Cascading Style Sheets), Javascript® and JScript®. For example, HTML language is used to create the interface for the tool, and the CSS is used to maintain a consistent style among all related pages. Javascript® is used to parse the information which is gathered in the interface and relay it to other tools or pages. JScript® is used where the security limitations of Javascript have to be exceeded to allow the application to function.

In some embodiments, JScript® objects call an ActiveX Data Objects Database (ADODB) library to negotiate connectivity from the client side machine 102. ADODB is an ActiveX control that allows the notation template tool 216, in some embodiments, to talk to other applications that are ODBC (Open DataBase Connectivity) compliant, which includes Microsoft Jet®, Access®, Microsoft SQL®, MySQL®, etc.

Since the notation template tool 216 may be constructed as a Hypertext Application (HTA) file, this allows the notation template tool 216 to implement server side processes, like database connectivity and file system access, on the client side machine, eliminating the need for a server 106 to run the application. Thus, advantageously, the notation template tool 216, as an HTA construct, has the ability to communicate to databases and create web pages at the same time without utilizing a server 106.

In some embodiments, the notation template tool 216 has the ability to submit forms in remote pages enabling customer information retrieval from other internal tools that have a web interface, without a user having to pull up the tool, login, and search for the customers information. While client side scripting may be insecure in some enviromnents, one embodiment of the present disclosure employs the customer information notation and tracking system behind a firewall of an organization, such as a corporate firewall, where most of the web applications utilized by a user are on a corporate intranet and do not exist outside the firewall. Note, a notation interface tool 216 constructed as an HTA application may be platform-dependent and utilize Internet Explorer 5.5 or above and a compatible operating system, such as a compatible Microsoft Windows® version.

If a computer tool is a similar web application and uses HTML authentication, the notation template tool 216 can control that web application. As such, the notation template tool 216, in some embodiments, inputs user identification and a password to another web application and has the application log in a particular user. If a computer tool is a dissimilar application written (e.g., in Java® or Oracle® as compared to HTML), the notation template tool 216 may not remotely control this tool and may not have the tool automatically log in a user, for some embodiments.

Via the HTA interface, the source code for the notation template tool 216 may be relatively small and uses client side processing, which helps distribute processing to multiple computers, instead of requiring an investment in larger server equipment for a large amount of users. The notation template tool 216 may also be set specific to users to activate certain programs or tools after certain conditions are met. The notation template tool 216 may also relay information to any database that allows a DAO (Data Access Objects) connection. Further, in some embodiments, processing or compiling is not needed of code for the notation template tool, since the code may be written in JScript® which is compiled at run time.

Advantageously, embodiments of the notation interface tool 216 are configured to accept direct notations and recording of customer service information and to report to multiple databases. Further, the notation interface tool 216 facilitates communication between dissimilar media (e.g., plain text files, Access® databases, SQL databases, web pages, etc.) and provides updates to dissimilar media from a single interface. The previously described embodiments of the notation interface tool 216 utilizing the HTA construct is but one embodiment of the present disclosure and is not meant to imply that notation interface tool 216 is limited to only this construct. Rather, alternative embodiments of the present disclosure are constructed utilizing different computer languages and platforms.

When components of the customer information notation and tracking system (e.g., notation interface tool 216, password manager application 218, etc.) are implemented in software, as is shown in FIG. 2, it should be noted that the components can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Components of the customer information notation and tracking system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where components of the customer information notation and tracking system are implemented in hardware, the components can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A method for sharing information during a customer service session, comprising:
a processing device of a computer displaying a plurality of customer service input process fields associated with a plurality of consumer service process steps, the plurality of input process fields being displayed concurrently in an interface of the computer, each of the plurality of input process fields associated with a plurality of record keeping systems;
the processing device obtaining a plurality of usernames and passwords for the plurality of record keeping systems by receiving an encrypted textual string and decrypting the encrypted textual string;

receiving a command from a user;

in response to receiving the command from the user, the processing device launching a computer tool from the interface and logging the user into a record keeping system of the computer tool wherein the record keeping system is one of the plurality of record keeping systems using a record keeping system username and password of the plurality of usernames and passwords obtain by decryption of the encrypted textual string and specific to the record keeping system;

the processing device sharing information provided in one of the input process fields with the computer tool launched from the interface; and the processing device automatically forwarding information provided in the input process fields at an end of the consumer service process to the record keeping system of the launched computer tool.

2. The method of claim 1, wherein the plurality of record keeping systems utilize dissimilar media.

3. The method of claim 1, further comprising:

copying information provided in one of the input process fields to a clipboard area in response to graphically selecting the input process field.

4. The method of claim 1, further comprising:

in response to receiving input in a particular field, automatically bringing focus to a particular computer tool associated with the particular field on a computer desktop of the computer.

5. The method of claim 1, further comprising:

storing a set of passwords and usernames for a plurality of computer tools of the computer;

in response to receiving a particular command from the interface to activate a particular computer tool, retrieving password and username for the particular computer tool and sending the password and username to the particular computer tool so that a computer tool interface is initially displayed on the computer with the user already logged into the particular computer tool.

6. The method of claim 1, further comprising:

prompting the user to provide username and password for a set of computer tools of the computer;

prompting the user to provide an encryption key to be used in encrypting the username and password for the set of computer tools; and encrypting the username and password using the encryption key into an encrypted textual string that is displayed to the user.

7. The method of claim 6, further comprising:

storing the username and password in computer memory by decrypting the encrypted textual string using the encryption key.

8. The method of claim 1, further comprising:

in response to a designated set of input fields receiving information, automatically compiling input information into a collection of notes; and communicating the collection of notes to at least one record keeping system.

9. The method of claim 8, further comprising:

displaying contents of the collection of notes as input information is added to the collection.

10. The method of claim 8, wherein the communicating step is performed using client side processing.

11. A computer readable storage medium having a computer program for sharing information during a customer service session, the program having instructions for performing:

displaying a plurality of consumer service input process fields associated with a plurality of consumer service process steps, the plurality of input process fields being displayed concurrently in an interface of a computer, each of the plurality of input process fields associated with a plurality of record keeping systems;

obtaining a plurality of usernames and passwords for the plurality of record keeping systems by receiving an encrypted textual string and decrypting the encrypted textual string;

receiving a command from a user;

in response to receiving the command from the user, launching a computer tool from the interface and logging the user into a record keeping system of the computer tool wherein the record keeping system is one of the plurality of record keeping systems using a record keeping system username and password of the plurality of usernames and passwords obtained by decryption of the encrypted textual string and specific to the record keeping system;

sharing information provided in one of the input process fields with the computer tool launched from the interface; and forwarding information provided in the input process fields at an end of the consumer service process to the record keeping system of the launched computer tool.

12. The medium of claim 11, the program further performing:

wherein the plurality of record keeping systems utilize dissimilar media.

13. The medium of claim 11, the program further performing:

copying information provided in one of the input process fields to a clipboard area in response to graphically selecting the input process field.

14. The medium of claim 11, the program further performing:

in response to receiving input in a particular field, automatically bringing focus to a particular computer tool associated with the particular field on a computer desktop of the computer.

15. The medium of claim 11, the program further performing:

storing a set of passwords and usernames for a plurality of computer tools of the computer;

in response to receiving a particular command from the interface to activate a particular computer tool, retrieving password and username for the particular computer tool and sending the password and username to the particular computer tool so that a computer tool interface is initially displayed on the computer with the user already logged into the particular computer tool.

16. The medium of claim 11, the program further performing:

prompting the user to provide username and password for a set of computer tools of the computer;

prompting the user to provide an encryption key to be used in encrypting the username and password for the set of computer tools; and encrypting the username and password using the encryption key into an encrypted textual string that is displayed to the user.

17. The medium of claim 16, the program further performing:
   storing the username and password in computer memory by decrypting the encrypted textual string using the encryption key.

18. The medium of claim 11, the program further performing:
   in response to a designated set of input fields receiving information, automatically compiling input information into a collection of notes; and
   communicating the collection of notes to at least one record keeping system.

19. The medium of claim 18, the program further performing:
   displaying contents of the collection of notes as input information is added to the collection.

20. The medium of claim 18, wherein the communicating step is performed using client side processing.

* * * * *